(12) United States Patent
Kimchi et al.

(10) Patent No.: US 12,032,391 B2
(45) Date of Patent: Jul. 9, 2024

(54) VIRTUAL SAFETY SHROUDS FOR AERIAL VEHICLES

(71) Applicant: Amazon Technologies, Inc., Seattle, WA (US)

(72) Inventors: Gur Kimchi, Seattle, WA (US); Louis Leroi LeGrand, III, Seattle, WA (US); Joshua White Traube, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1108 days.

(21) Appl. No.: 16/860,723

(22) Filed: Apr. 28, 2020

(65) Prior Publication Data

US 2020/0257314 A1     Aug. 13, 2020

Related U.S. Application Data

(60) Division of application No. 15/434,741, filed on Feb. 16, 2017, now Pat. No. 10,671,094, which is a
(Continued)

(51) Int. Cl.
*G05D 1/00*     (2006.01)
*B64C 27/00*     (2006.01)
(Continued)

(52) U.S. Cl.
CPC ........... *G05D 1/106* (2019.05); *B64C 27/006* (2013.01); *B64C 39/024* (2013.01); *B64D 1/12* (2013.01);
(Continued)

(58) Field of Classification Search
None
See application file for complete search history.

(56) References Cited

U.S. PATENT DOCUMENTS 3,417,729 A    12/1968   Gilday et al.
3,575,527 A     4/1971   Sumitani et al.
(Continued)

FOREIGN PATENT DOCUMENTS

CN     101385059 A     3/2009
CN     103224026 A     7/2013
(Continued)

OTHER PUBLICATIONS

Andrew Amato, "Parrot Announces New Bobop Drone", Dronelife.com, May 12, 2014; http://dronelife.com/2014/05/12/parrot-announces-new-bebop-drone/, accessed Dec. 21, 2016.
(Continued)

*Primary Examiner* — Hunter B Lonsberry
*Assistant Examiner* — Paysun Wu
(74) *Attorney, Agent, or Firm* — Athorus, PLLC

(57) ABSTRACT

An aerial vehicle and system for automatically detecting an object (e.g., human, pet, or other animal) approaching the aerial vehicle is described. When an approaching object is detected by an object detection component, a safety profile may be executed to reduce or avoid any potential harm to the object and/or the aerial vehicle. For example, if the object is detected entering a safety perimeter of the aerial vehicle, the rotation of a propeller closest to the object may be stopped to avoid harming the object and rotations of remaining propellers may be modified to maintain control and flight of the aerial vehicle.

19 Claims, 14 Drawing Sheets

Related U.S. Application Data continuation-in-part of application No. 14/491,215, filed on Sep. 19, 2014, now Pat. No. 10,780,988.

(60) Provisional application No. 62/036,071, filed on Aug. 11, 2014.

(51) Int. Cl.

| | | |
|---|---|---|
| *B64C 39/02* | (2023.01) | |
| *B64D 1/12* | (2006.01) | |
| *B64D 27/24* | (2006.01) | |
| *B64D 45/00* | (2006.01) | |
| *B64U 10/00* | (2023.01) | |
| *B64U 10/13* | (2023.01) | |
| *B64U 30/20* | (2023.01) | |
| *B64U 50/19* | (2023.01) | |
| *B64U 101/60* | (2023.01) | |
| *F16P 3/14* | (2006.01) | |
| *G06V 20/13* | (2022.01) | |
| *G06V 20/17* | (2022.01) | |
| *G08G 5/00* | (2006.01) | |
| *G08G 5/02* | (2006.01) | |
| *G08G 5/04* | (2006.01) | |
| *H02P 5/46* | (2006.01) | |
| *H02P 5/68* | (2006.01) | |
| *H02P 101/30* | (2015.01) | |

(52) U.S. Cl.
CPC ............ *B64D 27/24* (2013.01); *B64D 45/00* (2013.01); *F16P 3/14* (2013.01); *G05D 1/0055* (2013.01); *G05D 1/0833* (2013.01); *G06V 20/13* (2022.01); *G06V 20/17* (2022.01); *G08G 5/0021* (2013.01); *G08G 5/0069* (2013.01); *G08G 5/025* (2013.01); *G08G 5/045* (2013.01); *H02P 5/46* (2013.01); *H02P 5/68* (2013.01); *B64U 10/00* (2023.01); *B64U 10/13* (2023.01); *B64U 30/20* (2023.01); *B64U 50/19* (2023.01); *B64U 2101/60* (2023.01); *H02P 2101/30* (2015.01)

(56) References Cited

U.S. PATENT DOCUMENTS

| | | | |
|---|---|---|---|
| 3,805,723 A | 4/1974 | Bernaerts | |
| 5,371,581 A | 12/1994 | Wangler et al. | |
| 5,847,522 A | 12/1998 | Barba | |
| 6,676,460 B1 | 1/2004 | Motsenbocker | |
| 6,804,607 B1 | 10/2004 | Wood | |
| 7,171,879 B2 | 2/2007 | Gass et al. | |
| 7,335,071 B1 | 2/2008 | Motsenbocker | |
| 7,946,526 B2 | 5/2011 | Zimet | |
| 8,473,189 B2 | 6/2013 | Christoph | |
| 8,639,400 B1 | 1/2014 | Wong | |
| 9,193,452 B2 * | 11/2015 | Carreker | B64C 27/52 |
| 9,321,531 B1 | 4/2016 | Takayama et al. | |
| 9,677,564 B1 | 6/2017 | Woodworth et al. | |
| 2006/0287829 A1 | 12/2006 | Pashko-Paschenko | |
| 2007/0102565 A1 | 5/2007 | Speer et al. | |
| 2007/0210953 A1 | 9/2007 | Abraham et al. | |
| 2007/0246601 A1 | 10/2007 | Layton | |
| 2007/0262195 A1 | 11/2007 | Bulaga et al. | |
| 2008/0184906 A1 | 8/2008 | Kejha | |
| 2009/0027253 A1 | 1/2009 | Tooren et al. | |
| 2010/0100269 A1 | 4/2010 | Ekhaguere et al. | |
| 2010/0206145 A1 | 8/2010 | Tetelbaum et al. | |
| 2010/0299067 A1 | 11/2010 | McCollough et al. | |
| 2011/0178711 A1 | 7/2011 | Christoph | |
| 2011/0210866 A1 * | 9/2011 | David | G08G 1/166 |
| | | | 340/901 |
| 2011/0227435 A1 | 9/2011 | Maeda | |
| 2011/0253831 A1 | 10/2011 | Cheng | |
| 2011/0301787 A1 | 12/2011 | Chaperon et al. | |
| 2012/0091260 A1 | 4/2012 | Callou | |
| 2012/0229325 A1 * | 9/2012 | Dutruc | G01S 7/03 |
| | | | 342/29 |
| 2012/0235606 A1 | 9/2012 | Takeuchi | |
| 2013/0173114 A1 * | 7/2013 | Pillai | B60W 10/18 |
| | | | 701/41 |
| 2013/0206915 A1 | 8/2013 | Desaulniers | |
| 2013/0320133 A1 | 12/2013 | Ratti et al. | |
| 2013/0332062 A1 | 12/2013 | Kreitmair-Steck et al. | |
| 2014/0010656 A1 | 1/2014 | Nies | |
| 2014/0271200 A1 | 9/2014 | Sutton et al. | |
| 2015/0098819 A1 | 4/2015 | Tourin et al. | |
| 2015/0191255 A1 | 7/2015 | Zolich et al. | |
| 2015/0286216 A1 | 10/2015 | Miwa | |
| 2015/0314881 A1 | 11/2015 | Tsaliah et al. | |
| 2016/0001877 A1 | 1/2016 | Paulos | |
| 2016/0085238 A1 | 3/2016 | Hayes | |
| 2016/0125746 A1 | 5/2016 | Kunzi et al. | |

FOREIGN PATENT DOCUMENTS

| | | | | |
|---|---|---|---|---|
| CN | 203039518 U | | 7/2013 | |
| CN | 104760704 A | | 7/2015 | |
| EP | 3415436 A1 | | 12/2018 | |
| GB | 2455374 A | | 6/2009 | |
| GB | 2455374 B | | 11/2009 | |
| JP | S48088255 U | | 10/1973 | |
| JP | S56048952 | | 11/1981 | |
| JP | H0712088 A | | 1/1995 | |
| JP | 2009297449 A | | 12/2009 | |
| JP | 2010095246 A | | 4/2010 | |
| JP | 2012037204 A | | 2/2012 | |
| WO | 2007052246 A1 | | 5/2007 | |
| WO | 2008147484 A2 | | 12/2008 | |
| WO | 2008147484 A3 | | 2/2009 | |
| WO | WO-2009153588 A1 * | | 12/2009 | B64C 27/00 |
| WO | 2010070717 A1 | | 6/2010 | |
| WO | 2012012752 A2 | | 1/2012 | |
| WO | 2012012752 A9 | | 6/2012 | |
| WO | 2013140085 A1 | | 9/2013 | |
| WO | 2014064431 A2 | | 5/2014 | |
| WO | 2014068982 A1 | | 5/2014 | |
| WO | 2014080409 A1 | | 5/2014 | |
| WO | 2014064431 A3 | | 7/2014 | |

OTHER PUBLICATIONS

International Search Report for PCT Application No. PCT/US2015/044377 dated Oct. 19, 2015.
Ivan Barajas, "Parrot Unveils New Drone and Controller," May 14, 2014; https://blog.newegg.com/parrot-unveils-drone-controller-oculus-compatible/, accessed Dec. 21, 2016.
MicroPilot home page, https://www.micropilot.com/; archived on Jan. 3, 2013 by Internet Archive, http:/web.archive.org/web/2013103180733/http://www.micropilot.com/?, accessed May 2, 2016.
Norman Chan, "Hands-On with Parrot's Bebop Drone Quadcopter", tested.com, May 12, 2014; http://www.tested.com/tech/robots/461148-parrots-bebop-drone-what-you-should-know/, accessed Dec. 22, 2016.
rchelicopterfun.com, "Parrot AF Drone Quadcopter Review", http://www.rchelicopterfun.com/parrot-ar-drone.html; archived on Mar. 27, 2012 by Internet Active, http://web.archive.org/web/20120327140509/http://www.rchelicopterfun.com/parrot-ar-drone.html, accessed Apr. 27, 2016.
Search Report for Chinese Patent Application No. 201580043049.8, dated Nov. 30, 2018.
Wikipedia, "Apollo Abort Modes", https://en.wikipedia.org/wiki/Apollo_abort_modes; archived by Internet Archive on Aug. 16, 2012, https://web.archive.org/web/20120816115115/https://en.wikipedia.org/wiki/Apollo_abort_modes; accessed Jul. 9, 2019 (Year: 2012).
Wikipedia, "Space Shuttle Abort Modes," https://en.wikipedia.org/wiki/Space_Shuttle_abort_modes; archived by Internet Archive on Aug. 15, 2012, https://web.archive.org/web/20120815031221/https://

(56) References Cited

OTHER PUBLICATIONS en.wikipedia.org/wiki/Space_Shuttle_abort_modes; accessed Jul. 9, 2019 (Year: 2012).

* cited by examiner

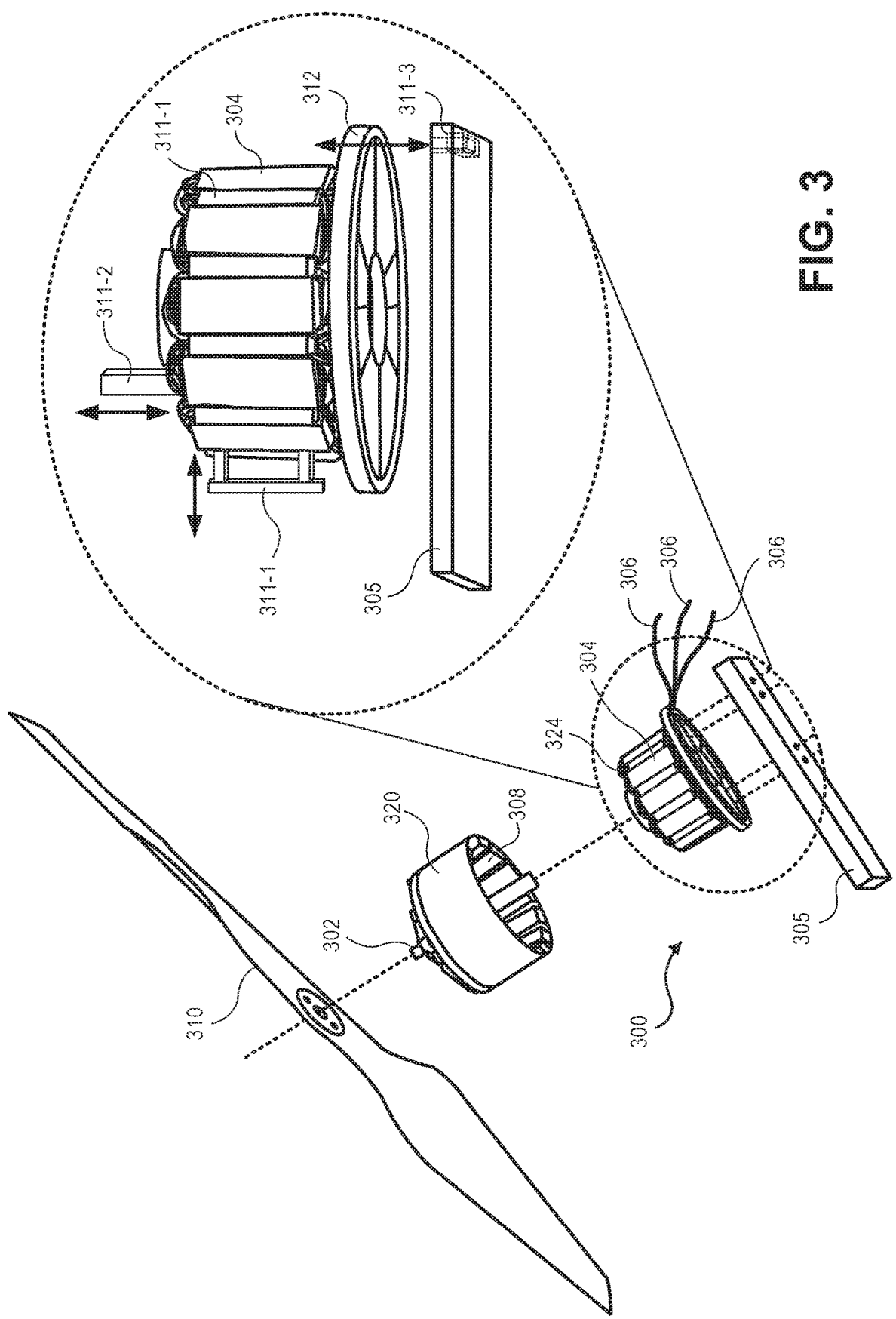

ns of an automated aerial vehicle control system, according to an implementation.
VIRTUAL SAFETY SHROUDS FOR AERIAL VEHICLES

CROSS-REFERENCE TO RELATED APPLICATIONS

This application is a divisional of and claims priority to U.S. application Ser. No. 15/434,741, filed Feb. 16, 2017, which is a continuation-in-part of and claims priority to U.S. application Ser. No. 14/491,215, filed Sep. 19, 2014, and claims priority to U.S. Application No. 62/036,071, filed Aug. 11, 2014, which are incorporated herein by reference in their entirety.

BACKGROUND

Aerial vehicles, such as automated aerial vehicles, are increasing in use. For example, unmanned aerial vehicles are often used for surveillance and multi-propeller automated aerial vehicles are utilized by many hobbyists, often flying them at public parks, or other areas populated by humans, pets and other animals. The propellers, which rotate at a very high speed, are dangerous and potentially harmful if contact with the propeller by a human, pet, or other animal occurs while the propeller is rotating. Accordingly, it may be desirous to avoid contact with any part, including rotating propellers, of an aerial vehicle while also maintaining control and flight of the aerial vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 3 is a diagram of a motor and a propeller, according to an implementation.

Figure 1:
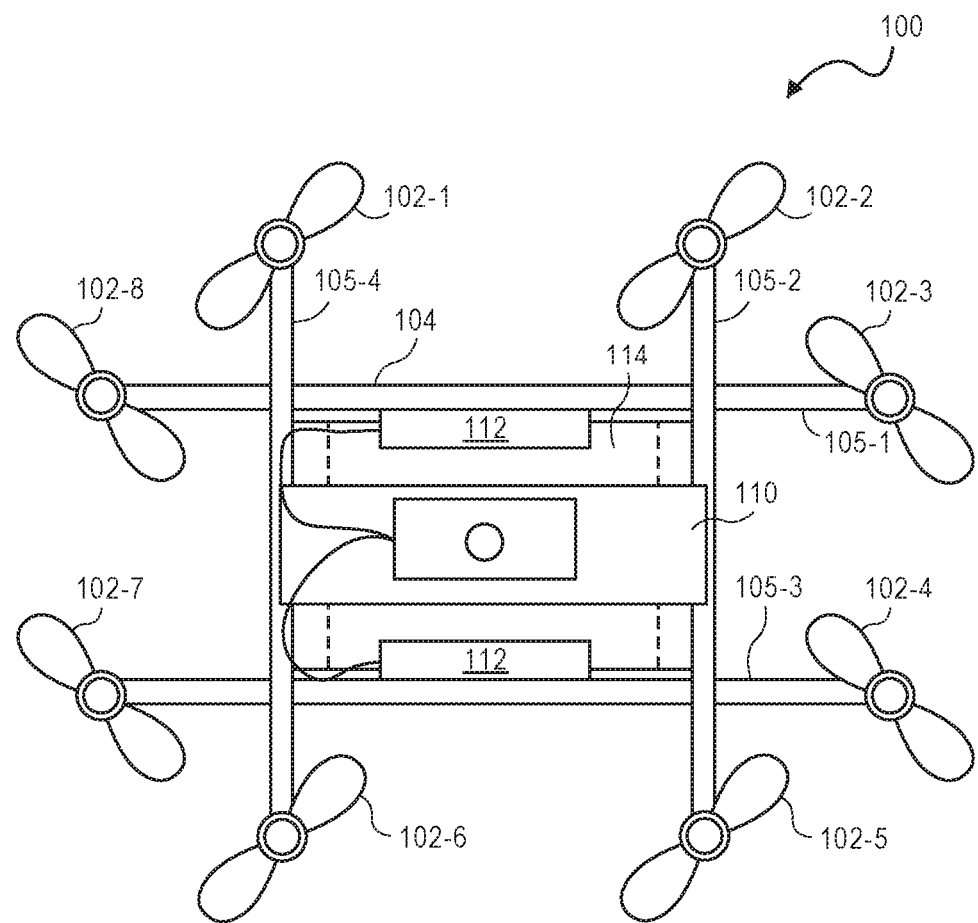
FIG. 1 depicts a block diagram of a top-down view of an automated aerial vehicle, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes an aerial vehicle, such as an automated aerial vehicle ("AAV"), and system for automatically detecting a contact or an imminent contact between a propeller of the AAV and an object (e.g., human, pet, or other animal), or between the aerial vehicle as a whole and an object. Contact may be detected based on a change in an electrical current through the propeller resulting from the contact, based on a change in external force applied to the propeller, based on a contact detected by a pressure sensitive material on the propeller, a change in an expected position of the propeller, a change in propeller vibration, a change in an audible characteristic of the propeller, etc. Upon detecting a contact between the propeller and an object, a safety profile is automatically performed to reduce any harm to the object and/or the AAV by quickly stopping the propeller. For example, the propeller may be stopped by removing the current to the motor that rotates the propeller, reversing the polarity of the current to the motor that rotates the propeller, deploying a stop bar that contacts the rotor of the motor to stop the rotation of the motor and the propeller, transitioning weights to the perimeter of the propeller to stop the rotation of the propeller, disengaging from the motor the shaft that rotates the propeller, releasing the clamps that secure the propeller to the motor, reorienting the propeller blades, etc.

In other implementations, a sensor may be used to detect an imminent contact with the propeller by an object. For example, a rangefinder mounted to the AAV may detect an object entering a safety perimeter (discussed below) of the propeller. When the object is detected, a safety profile is automatically performed to either avoid or prevent the contact from occurring. For example, the propeller may be stopped and/or the AAV may maneuver away from the detected object. In some implementations, one or more additional propellers of the AAV may also be stopped to further reduce the likelihood of a harmful contact between a propeller of the AAV and the object.

By eliminating or reducing harmful contacts between a propeller of an AAV and an object, AAVs may be operated in areas with unknown or changing surroundings without injuring the AAV or objects (e.g., humans, pets, or other animals). For example, an AAV may be configured to deliver a payload that contains an item ordered from an e-commerce website to a customer specified location (e.g., a backyard of customer's home). As the AAV is preparing to land at the customer specified location to deliver the payload, it may monitor for objects (e.g., pets, humans) approaching the AAV and quickly respond to prevent the object from becoming harmed. For example, if a dog (object) approaches the AAV as the AAV is landing and the dog enters the safety perimeter of one of the propellers of the AAV, a safety profile is automatically performed so that the dog is not harmed by the propeller. As discussed below, the safety profile may include stopping the propeller, stopping other propellers of the AAV, maneuvering the AAV away from the object, landing the AAV, emitting an audible tone, altering an orientation of the blades of the propeller, etc.

In other implementations, one or more sensors may be used to detect an object approaching the aerial vehicle. For example, a plurality of optical sensors mounted to the aerial vehicle may detect an object entering a vehicle safety perimeter (discussed below) of the aerial vehicle. When the object is detected, a vehicle safety profile is automatically performed to either avoid or prevent the contact from occurring and/or reduce the potential harm from such contact. For example, the aerial vehicle may maneuver away from the detected object and/or a propeller closest to the approaching object may be slowed or stopped, such as by regeneratively braking the propeller. The operation of one or more of the propellers that are not slowed or stopped may be modified to maintain a current flight status, such as a hover flight mode, of the aerial vehicle and/or to perform an avoidance maneuver. In some implementations, one or more additional propellers of the aerial vehicle may also be slowed or stopped to further reduce the likelihood of a harmful contact between the aerial vehicle and the object.

By eliminating or reducing harmful contacts between an aerial vehicle and an object and by slowing or stopping a propeller closest to an object while modifying operation of remaining propellers, aerial vehicles may be safely and controllably operated in areas with unknown or changing surroundings without causing harm to the aerial vehicle or objects (e.g., humans, pets, or other animals). For example, an aerial vehicle may be operating substantially in a hover flight mode while delivering a payload that contains an item ordered from an e-commerce website to a customer specified location (e.g., a backyard of customer's home). As the aerial vehicle hovers near the customer specified location to deliver the payload, it may monitor for objects (e.g., pets, humans) approaching the aerial vehicle and quickly respond to prevent the object from becoming harmed while also maintaining control and flight of the aerial vehicle. For example, if a dog (object) approaches the aerial vehicle as the aerial vehicle is hovering and the dog enters the vehicle safety perimeter of the aerial vehicle, a vehicle safety profile is automatically performed so that the dog is not harmed by the aerial vehicle. As discussed below, the vehicle safety profile may include slowing or stopping one or more propellers closest to the approaching object and modifying the operation of one or more remaining propellers to maintain hovering flight by the aerial vehicle and/or to perform an avoidance maneuver.

In some implementations, the AAV will communicate with other AAVs in the area to provide and/or receive information, such as AAV identification, current position, altitude, velocity, etc. For example, AAVs may be configured to support automatic dependent surveillance-broadcast (ADS-B) and both receive and/or transmit identification, current position, altitude, and velocity information. This information may be stored in a central location and/or dynamically shared between nearby AAVs, materials handling facilities, relay locations, the AAV management system and/or other locations. For example, other AAVs may provide ADS-B information and/or additional information regarding weather (e.g., wind, snow, rain), landing conditions, traffic, objects, safety profiles used in different areas, safety profiles performed, etc. Receiving AAVs may utilize this information to plan the route/flight path from a source location to a destination location, to select a safety profile for use in monitoring for objects, to modify the actual navigation of a route, etc.

While the examples discussed herein primarily focus on AAVs in the form of an aerial vehicle utilizing multiple propellers to achieve flight (e.g., a quad-copter or octo-copter), it will be appreciated that the implementations discussed herein may be used with other forms and configurations of AAVs.

As used herein, a "materials handling facility" may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. A "delivery location," as used herein, refers to any location at which one or more items may be delivered. For example, the delivery location may be a residence, a place of business, a location within a materials handling facility (e.g., packing station, inventory storage), any location where a user or inventory is located, etc. Inventory or items may be any physical goods that can be transported using an AAV.

A "relay location," as used herein, may include, but is not limited to, a delivery location, a materials handling facility, a cellular tower, a rooftop of a building, a delivery location, or any other location where an AAV can land, charge, retrieve inventory, replace batteries, and/or receive service.

FIG. 1 illustrates a block diagram of a top-down view of an AAV 100, according to an implementation. As illustrated, the AAV 100 includes eight propellers 102-1, 102-2, 102-3, 102-4, 102-5, 102-6, 102-7, 102-8 spaced about the frame 104 of the AAV. The propellers 102 may be any form of propeller (e.g., graphite, carbon fiber) and of a size sufficient to lift the AAV 100 and any inventory engaged by the AAV 100 so that the AAV 100 can navigate through the air, for example, to deliver an item to a delivery location. While this example includes eight propellers, in other implementations, more or fewer propellers may be utilized. Likewise, in some implementations, the propellers may be positioned at different locations on the AAV 100. In addition, alternative methods of propulsion may be utilized. For example, fans, jets, turbojets, turbo fans, jet engines, and the like may be used to propel the AAV.

The frame 104 or body of the AAV 100 may likewise be of any suitable material, such as graphite, carbon fiber and/or aluminum. In this example, the frame 104 of the AAV 100 includes four rigid members 105-1, 105-2, 105-3, 105-4, or beams arranged in a hash pattern with the rigid members intersecting and joined at approximately perpendicular angles. In this example, rigid members 105-1 and 105-3 are arranged parallel to one another and are approximately the same length. Rigid members 105-2 and 105-4 are arranged parallel to one another, yet perpendicular to rigid members 105-1 and 105-3. Rigid members 105-2 and 105-4 are approximately the same length. In some embodiments, all of the rigid members 105 may be of approximately the same length, while in other implementations some or all of the rigid members may be of different lengths. Likewise, the spacing between the two sets of rigid members may be approximately the same or different.

While the implementation illustrated in FIG. 1 includes four rigid members 105 that are joined to form the frame 104, in other implementations, there may be fewer or more components to the frame 104. For example, rather than four rigid members, in other implementations, the frame 104 of the AAV 100 may be configured to include six rigid members. In such an example, two of the rigid members 105-2, 105-4 may be positioned parallel to one another. Rigid members 105-1, 105-3 and two additional rigid members on either side of rigid members 105-1, 105-3 may all be positioned parallel to one another and perpendicular to rigid members 105-2, 105-4. With additional rigid members, additional cavities with rigid members on all four sides may be formed by the frame 104. A cavity within the frame 104 may be configured to include an inventory engagement mechanism for the engagement, transport and delivery of item(s) and/or containers that contain item(s).

In some implementations, the AAV may be configured for aerodynamics. For example, an aerodynamic housing may be included on the AAV that encloses the AAV control system 110, one or more of the rigid members 105, the frame 104 and/or other components of the AAV 100. The housing may be made of any suitable material(s), such as graphite, carbon fiber, aluminum, etc. Likewise, in some implementations, the location and/or the shape of the inventory (e.g., item or container) may be aerodynamically designed. For example, in some implementations, the inventory engagement mechanism may be configured such that, when the inventory is engaged, it is enclosed within the frame and/or housing of the AAV 100 so that no additional drag is created during transport of the inventory by the AAV 100. In other implementations, the inventory may be shaped to reduce drag and provide a more aerodynamic design of the AAV and the inventory. For example, if the inventory is a container and a portion of the container extends below the AAV when engaged, the exposed portion of the container may have a curved shape.

The propellers 102 and corresponding propeller motors are positioned at both ends of each rigid member 105. The rigid members 105 to which a propeller motor is mounted is also referred to herein as a motor arm. The propeller motors may be any form of motor capable of generating enough speed with the propellers to lift the AAV 100 and any engaged inventory, thereby enabling aerial transport of the inventory. For example, the propeller motors may each be a FX-4006-13 740 kv multi rotor motor. Example implementations of motor configurations that may be used with various implementations are described in further detail below with respect to FIGS. 2-4. The propellers may be of any size and material sufficient to lift the AAV 100 and any engaged payload. In some implementations, the propellers may be formed of a conductive material, such as carbon fiber, aluminum, graphite, silver, copper, steel, etc. In some implementations, the propellers may include a pressure sensitive material that can detect a touch of an object with the propeller. In other implementations, the propellers may be configured such that the blades of the propellers may re-orient as part of a safety profile. For example, when a contact or an imminent contact is detected, the blades of the propellers may be re-oriented approximately ninety degrees so that the leading edge of the propeller is a flat portion of the propeller blade. In still another example, the propellers may include deployable weights. The deployable weights may typically be maintained at or near a center of the propeller. However, if a safety profile is executed, the weights may be released, moving them to the outer perimeter of the propeller, thereby slowing or stopping the rotation of the propeller. In yet another implementation, the blades of the propellers may be hinged near a center point of the propeller so that they deflect when contact with an object occurs.

Mounted to the frame 104 is the AAV control system 110. In this example, the AAV control system 110 is mounted in the middle and on top of the frame 104. The AAV control system 110, as discussed in further detail below with respect to FIG. 13, controls the operation, routing, navigation, communication, safety profile selection and implementation, and the inventory engagement mechanism of the AAV 100.

Likewise, the AAV 100 includes one or more power modules 112. In this example, the AAV 100 includes two power modules 112 that are removably mounted to the frame 104. The power module for the AAV may be in the form of battery power, solar power, gas power, super capacitor, fuel cell, alternative power generation source, or a combination thereof. For example, the power modules 112 may each be a 6000 mAh lithium-ion polymer battery, polymer lithium ion (Li-poly, Li-Pol, LiPo, LIP, PLI or Lip) battery. The power module(s) 112 are coupled to and provide power for the AAV control system 110 and the propeller motors.

In some implementations, one or more of the power modules may be configured such that it can be autonomously removed and/or replaced with another power module while the AAV is landed. For example, when the AAV lands at a delivery location, relay location and/or materials handling facility, the AAV may engage with a charging member at the location that will recharge and/or replace the power module.

As mentioned above, the AAV 100 may also include an inventory engagement mechanism 114. The inventory engagement mechanism may be configured to engage and disengage items and/or containers that hold items. In this example, the inventory engagement mechanism 114 is positioned within a cavity of the frame 104 that is formed by the intersections of the rigid members 105. The inventory engagement mechanism may be positioned beneath the AAV control system 110. In implementations with additional rigid members, the AAV may include additional inventory engagement mechanisms and/or the inventory engagement mechanism 114 may be positioned in a different cavity within the frame 104. The inventory engagement mechanism may be of any size sufficient to securely engage and disengage containers that contain inventory. In other implementations, the engagement mechanism may operate as the container, containing the inventory item(s) to be delivered. The inventory engagement mechanism communicates with (via wired or wireless communication) and is controlled by the AAV control system 110.

While the implementations of the AAV discussed herein utilize propellers to achieve and maintain flight, in other implementations, the AAV may be configured in other manners. For example, the AAV may include fixed wings and/or a combination of both propellers and fixed wings. For example, the AAV may utilize one or more propellers to enable takeoff and landing, and a fixed wing configuration or a combination wing and propeller configuration to sustain flight while the AAV is airborne.

Figure 2:
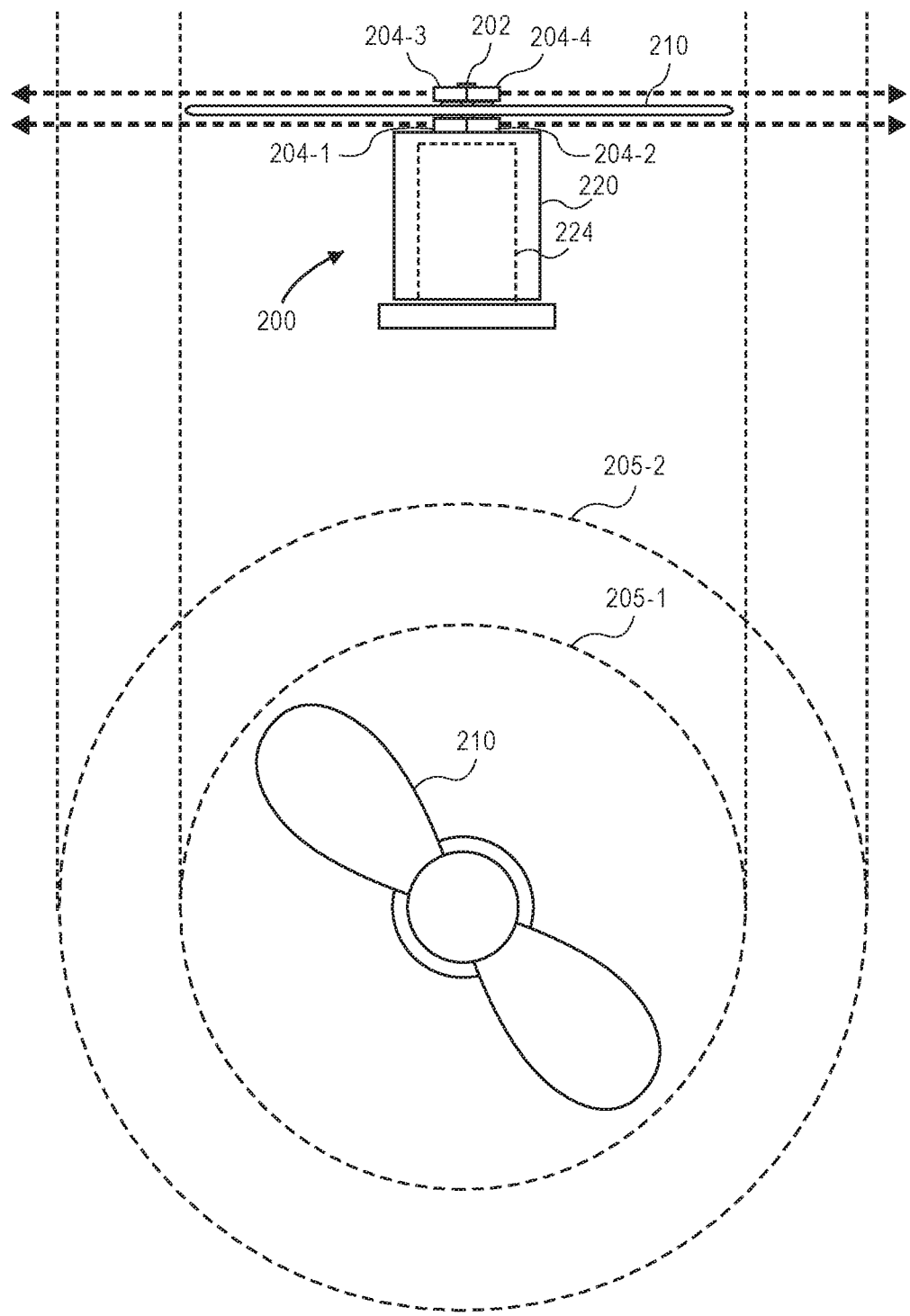
FIG. 2 depicts a top-down and side view of a motor and a propeller of an automated aerial vehicle, according to an implementation.

FIG. 2 depicts a top-down and side view of a motor 200 and a propeller 210 of an AAV 100 (FIG. 1), according to an implementation. In the discussed examples, the motor 200 is an outrunner brushless motor. In other implementations, the motor may be a different type of motor, such as an inrunner brushless motor, a brushed motor, etc.

The motor 200 includes a rotor 220 (outer portion) which rotates around a stator 224 (or inner portion). Mounted to the rotor 220 is a rotating shaft 202 that rotates with the rotor 220. The propeller 210 is coupled to the rotating shaft 202 and rotates with the rotating shaft 202.

A rotor 220 typically has four or more magnetic poles. The stator 224, also known as an armature, includes an electromagnetic assembly that is charged or controlled by an electronic speed control that provides current to the electromagnets. As the current is applied to the stator 224, the differing polarities between the charged electromagnets and the fixed magnetic poles of the rotor 220 cause the rotor 220 to rotate, which in turn causes the rotating shaft 202 and the propeller 210 to rotate.

One or more object detection components 204 may be coupled to the rotor 220 and/or the rotating shaft 202 such that the object detection components 204 rotate as the rotor 220 rotates. In this example, two object detection components 204-1, 204-2 are coupled to the rotating shaft 202 and the top of the rotor 220 and positioned beneath the propeller 210 to detect any objects approaching the propeller 210 from below the propeller 210. In this example, the two object detection components 204-1, 204-2 are oriented in opposite directions. By incorporating pairs of object detection components in opposite directions, rotational balance of the rotor is maintained. If there is a protective housing around the motor 200, the object detection components may be positioned above and outside the housing, or one or more openings may be included in the housing so that the object detection components may transmit signals through the openings to detect objects.

Two object detection components 204-3, 204-4 may also be coupled to the rotating shaft 202 above the propeller 210 to detect any objects approaching the propeller 210 from above. As illustrated, the pair of object detection components 204-3, 204-4 are also oriented in opposite directions. In some implementations, the two pairs of object detection components, the lower pair of object detection components 204-1, 204-2 and the upper pair of object detection components 204-3, 204-4, may be oriented at approximately ninety degrees with respect to each other. In other implementations, they may be oriented in the same direction, or any other angle with respect to each other.

While the object detection components 204-1, 204-2 detect objects approaching from below and object detection components 204-3, 204-4 detect objects approaching from above, all four object detection components 204 may be utilized to detect objects approaching from the perimeter or side of the propeller 210. The vertical separation between object detection components 204-1, 204-2 and object detection components 204-3, 204-4 may be small enough to detect objects approaching from the perimeter or side of the propeller 210. For example, the vertical separation may be between approximately five and approximately ten centimeters.

The object detection components 204 may be any form of device that can be used to detect a presence of an object. For example, the object detection components 204 may be any one of an ultrasonic ranging module, a laser rangefinder, a radar distance measurement module, stadiametric based rangefinder, a parallax based rangefinder, a coincidence based rangefinder, a Lidar based rangefinder, Sonar based rangefinder, or a time-of-flight based rangefinder. In some implementations, different object detection components may be utilized on the AAV. For example, the object detection component 204-1 may be a laser rangefinder and the object detection component 204-2 may be a radar distance measuring module. Likewise, in some implementations, the object detection component 204 may also be configured to determine a distance between a detected object and the object detection component.

By mounting the object detection components 204 to the rotor and/or the rotating shaft, the object detection components 204 rotate as the motor and propeller turn. As the object detection components rotate, they emit signals configured to detect a presence of an object and, when an object is detected, determine a distance between the object and the AAV. By rotating the object detection component with the rotation of the motor, a 360 degree perimeter around the propeller can be monitored with the object detection components.

For example, the object detection component may be a laser based rangefinder that emits a laser (signal) as it rotates with the rotation of the propeller. When the emitted laser contacts an object, the laser is reflected back to and received by the object detection component 204. Based on the time of the emission and the receipt of the reflected laser, the distance between the object and the object detection component, and thus the AAV, can be determined.

While the above example illustrates coupling the object detection component(s) to the rotor and/or the rotating shaft, it will be appreciated that in other implementations, the object detection component(s) may be mounted to other locations of the AAV. For example, one or more object detection components may be mounted to the body of the AAV and oriented to emit signals to detect the presence of an object before it contacts the AAV. In such an implementation, the object detection component(s) may be coupled to the AAV in a fixed or rotating configuration.

In some implementations, the motor may communicate with or include Electronic Speed Control (ESC) circuitry that keeps track of the position of the rotor 220 so it can control the electromagnetics of the stator. The position of the rotor 220 may be determined using, for example, magnetic sensors (based on the Hall-effect) or using what is known as "sensorless" techniques. Generally, using sensorless techniques, the position of the rotor is determined by monitoring the motor power wires (not shown) for fluctuations caused by the spinning magnets of the rotor. Other techniques may also be utilized for determining the position of the rotor. For example, a marker or other identifier may be included on the rotor 220, rotating shaft 202 and/or the propeller 210 at a determined position. A sensor may be used to detect the position of the marker and, each time the marker passes the sensor, the position of the rotor 220 and thus the object detection component(s) are known. In some implementations, the position of the rotor 220 may not be determined and/or may only be determined periodically. For example, the position of the rotor 220 may not be monitored unless an object is detected. When an object is detected, the position of the rotor 220 may be determined to determine the position of the AAV with respect to the object.

By mounting the object detection components at known positions on the rotor 220 and/or rotating shaft 202 and monitoring the position of the rotor 220, the direction of the signal emitted from the object detection component, with respect to the position of the AAV 100, is known. When an object is detected, the distance to the object is determined and, based on the position of the object detection component, the direction of the object with respect to the AAV is also determined.

In some implementations, a safety profile module 1313 (FIG. 13) may communicate with the object detection components 204 to monitor for objects entering an established safety perimeter 205 surrounding one or more of the propellers 210 of the AAV. A safety perimeter 205 may be any defined distance surrounding a propeller 210. Depending on a selected safety profile (discussed below), the size of the safety perimeter 205 around the propeller 210 may vary. For example, when an expanded perimeter safety profile is selected, an expanded safety perimeter 205-2 may be monitored to detect for objects entering the expanded safety perimeter 205-2. An expanded safety profile may be used when the AAV 100 is located in areas where an encounter with an object is more likely and/or where additional safety is desired. For example, when the AAV is landing, taking off, flying at a low altitude, near buildings, etc., an expanded safety profile may be selected and a corresponding expanded safety perimeter 205-2 monitored for objects entering the expanded safety perimeter 205-2. If an object is detected within the expanded safety perimeter 205-2, the expanded safety profile is automatically performed, as discussed further below.

In a similar manner, when a contracted perimeter safety profile is selected, the contracted safety perimeter 205-1 may be monitored for objects entering the contracted safety perimeter 205-1. The contracted safety profile may be used when the AAV 100 is located in areas where an encounter with an object is unlikely. For example, when the AAV is in-route, traveling at a high altitude, in a controlled area (e.g., materials handling facility), etc., a contracted safety profile may be selected and a corresponding contracted safety perimeter 205-1 monitored for objects entering the contracted safety perimeter 205-1. If an object is detected within the contracted safety perimeter 205-1, the contracted safety profile may be automatically performed, as discussed further below.

The safety perimeters, such as contracted safety perimeter 205-1 or the expanded safety perimeter 205-2, may be any defined distance or perimeter around a propeller. For example, the contracted safety perimeter 205-1 may be a perimeter that extends approximately five centimeters from the ends of the propeller 210. In comparison, the expanded safety perimeter 205-2 may be a perimeter that extends approximately ten centimeters from the ends of the propeller 210. In other implementations, the perimeters may be different distances from the ends of the propeller 210.

In some implementations, there may be no safety perimeter and/or no object detection components 204. For example, rather than monitoring for an object entering a safety perimeter 205, the propellers 210 may be monitored for a contact. For example, the propellers 210 may be formed of an electrically conductive material (e.g., carbon fiber, graphite, aluminum) and a current through the propeller and/or capacitance of the propeller may be monitored for a change resulting from a contact. In still another implementation, the propellers may include a pressure sensitive material that is monitored for a contact with an object. In other implementations, the electronic speed controls (ESCs) may be monitored for a change in an external force applied to the propeller, resulting from a contact with the propeller by an object. In still another example, the position of the propeller may be monitored and if the expected position of the propeller does not correspond with the actual position, it may be determined that a contact with an object by the propeller has occurred. In response to a change in a current and/or capacitance of the propeller, a contact detected by a pressure sensitive material of the propeller, a change in an external force applied to the propeller and/or a change in an expected position of the propeller, a safety profile is automatically performed, as discussed further below.

In some implementations, both a contact with the propeller and a safety perimeter may be monitored. If either detect an object, a safety profile may be automatically performed, to reduce or avoid any contact with the object. Likewise, in some implementations, the contracted safety profile may include monitoring for a contact with the propeller by an object, and the expanded safety profile may include monitoring a perimeter surrounding the propeller.

In some implementations, such as when the AAV is located within a controlled area, for example a materials handling facility, monitoring for objects may be done by components that are external to the AAV. For example, an AAV management system of the materials handling facility may communicate with and/or control the AAV and one or more cameras within the materials handling facility may monitor the area surrounding the AAV for objects. If an object is detected, the AAV management system may cause the AAV to avoid the object by navigating the AAV away from the object. In other implementations, if the object enters a safety perimeter of one of the AAV propellers, the AAV management system may cause a safety profile to be performed by the AAV.

FIG. 3 is a diagram of a motor 300 and a propeller 310, according to an implementation. As discussed above, the motor 300 may be mounted to an end of a motor arm 305. The example illustrated in FIG. 3 depicts components of an outrunner brushless motor. The motor 300 includes a stator 324, a rotor 320 and a rotating shaft 302. The propeller 310 mounts to the rotating shaft 302. The motor 300 communicates with the ESC 1304 (FIG. 13) circuitry via wires 306. The ESC 1304 may be included in the AAV control system and the wires 306 may extend from the motor 300, through the motor arm 305 to the ESC 1304. In other implementations, the communication between the motor 300 and the ESC may be done wirelessly.

The motor 300 and attached propeller 310 are rotated in response to the ESC 1304 providing a current to the motor 300 that charges the electromagnets 304. The charged electromagnets 304 of the stator 324 cause the rotor 320 to rotate. In typical operation, the ESC 1304 charges the electromagnets by sending a current to the motors over the three different wires 306 in the form of different square waves. The speed of the motor is controlled by increasing or decreasing the length of the square waves sent over the three wires 306. To stop the motor 300, the current may be removed from the motor 300, thereby removing the charge from the electromagnets 304 and causing the motor 300 to stop. In another implementation, the sequence of current and/or the polarity of the square waves may be altered or reversed causing the electromagnets 304 of the stator 324 to stop the rotor 320 and thus the propeller 310. Because the electromagnets 304 of the stator 324 respond very quickly to current changes, the motor 300 can be stopped in only a few degrees of rotation by reversing the polarity of the current or by removing the current from the motor 300.

As an alternative, or in addition to, removing or reversing the current to the motor 300, in some implementations, the motor may include one or more stop bars 311 that may be deployed by the safety profile module 1313 (FIG. 13) from a retracted position to an extended position to stop the rotation of the rotor 320 of the motor 300 and, thus, stop the rotation of the propeller 310. During normal operation, the stop bar(s) 311 are maintained in a retracted position between the electromagnets 304 or within the stator 324. When deployed, the stop bar(s) 311-1 move from the retracted position to an extended position that causes the stop bar(s) 311-1 to engage the rotor 320 of the motor 300.

For example, as illustrated in the expanded view of the stator 324, the stator 324 may include one or more stop bars 311-1 positioned between the poles of the electromagnets 304 that are deployable into the rotor 320. In some implementations, the stop bars 311-1 may be narrower than the gaps between the fixed magnets 308 mounted to the interior of the rotor 320. When the stop bar(s) 311-1 are deployed into the extended position, the stop bar(s) 311-1 lodge between the fixed magnets 308, thereby forcing the rotor 320 to stop rotating. Alternatively, the stop bar(s) 311-1 may be wider than the gap between the fixed magnets 308 of the rotor and may be configured to deploy into the interior of the rotor 320 stopping the rotor using friction. For example, the stop bar(s) 311-1 may have a rubber or other similar facing that, when deployed into the interior of the rotor 320, will cause the rotor to stop rotating, without damaging the rotor.

In some implementations, one or more stop bar(s) 311-2 may be positioned in the interior of the stator 324 and configured to deploy vertically from a retracted position to an extended position. When extended vertically, the stop bar(s) 311-2 will extend into an opening between two support arms (not shown) on the top of the rotor 320 that secure the rotating shaft 302 to the rotor 320. When a support arm contacts the extended stop bar(s) 311-2, it will force the rotor 320, and thus the propeller 310, to stop rotating.

In still another example, one or more stop bar(s) 311-3 may be included in the motor arm 305 and configured to extend from a retracted position to an extended position. The stop bar(s) 311-3 may be narrower than the gap between the fixed magnets 308 of the rotor such that, when deployed into an extended position, it will fit between two fixed magnets 308 of the rotor 320. When the stop bar(s) 311-3 is in a retracted position, the rotor 320 of the motor is able to rotate. When the stop bar(s) 311-3 is deployed into the extended position, the stop bar(s) 311-3 moves vertically from the motor arm 305 through an opening in the base 312 of the stator 324 and positions itself between a pair of the fixed magnets 308 of the rotor 320, thereby forcing the rotor 320 to stop rotating and, thus, stopping the rotation of the propeller 310.

Figure 4A:
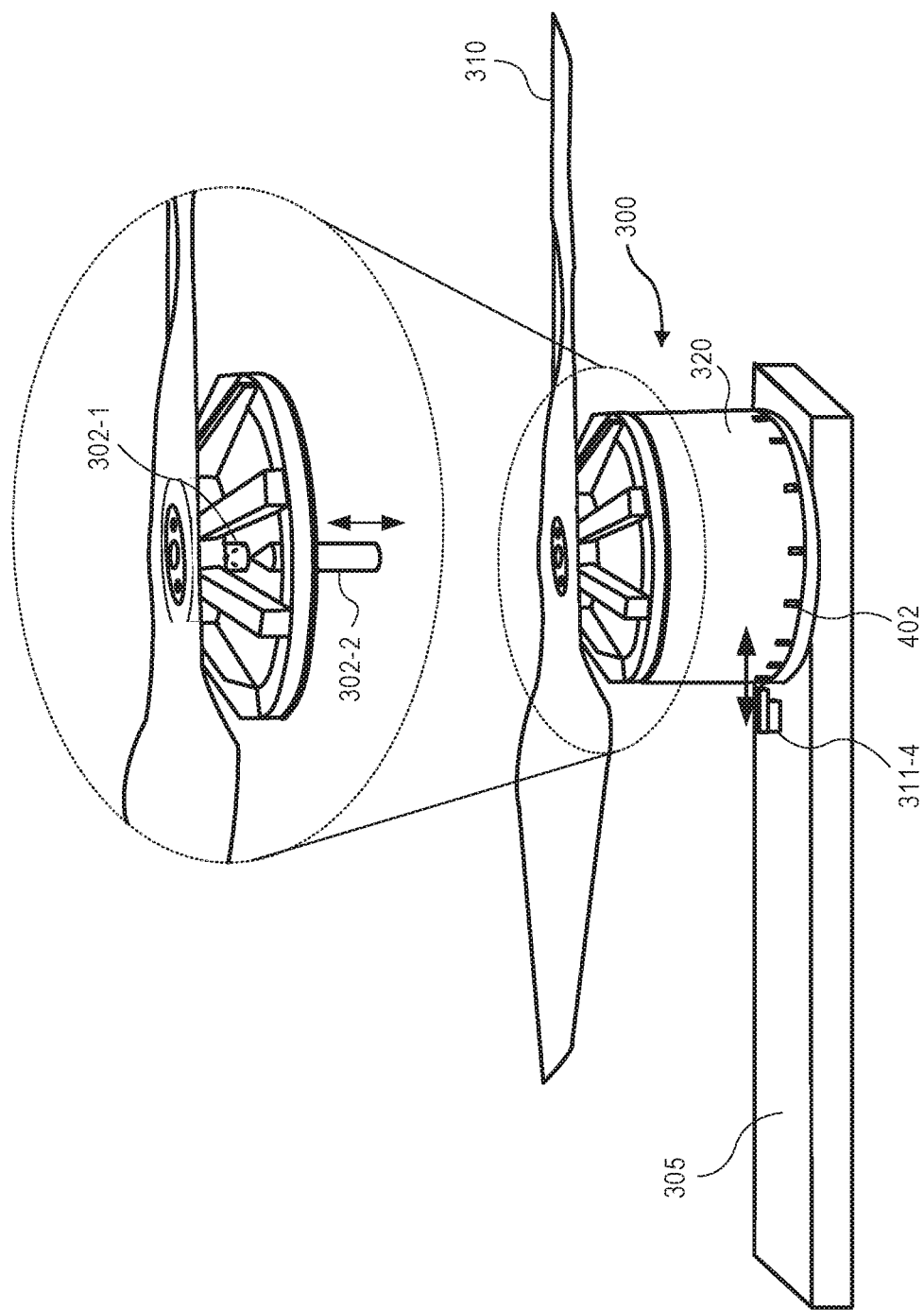
FIG. 4A is a diagram of another motor and a propeller, according to an implementation.

FIG. 4A is a diagram of another motor 300 and a propeller 310, according to an implementation to stop the rotation of the motor 300. The example configuration of FIG. 4A illustrates a stop bar 311-4 that may be mounted to the motor arm 305 and deployed from a retracted position to an extended position. When the stop bar 311-4 is in the retracted position, the motor 300 is able to operate normally. When the stop bar 311-4 is deployed, it engages the rotor 320 of the motor 300 and causes the rotor 320 to stop rotating. For example, the rotor 320 may include one or more openings 402 that are aligned with the stop bar 311-4 such that, when the stop bar 311-4 is deployed, it will extend into one of the openings 402, thereby forcing the rotor 320 to stop rotating.

In some implementations, as another alternative, the rotating shaft 302 may be disengaged from the propeller 310, as illustrated in the expanded view of FIG. 4A. For example, the rotating shaft may include a first portion 302-1 that is coupled to the propeller 310 and mates with, and is rotated by a second portion 302-2 of the rotating shaft 302 that is coupled to the rotor 320 of the motor. During normal operation, the first portion 302-1 and the second portion 302-2 are mated so that the motor can rotate the propeller 310. When a signal is received from the safety profile module 1313, the second portion 302-2 may retract and disengage from the first portion 302-1. Because the propellers 310 have little weight, when they are not rotated by the rotating shaft, they will cause little or no damage/harm when they come into contact with an object. In another example, one or more pins, clamps or connectors that secure the propeller to the motor may be released or disengaged so that the propeller will not continue rotating with the motor.

Similar to the stop bar(s) 311, the second portion 302-2 of the rotating shaft may operate as a clutch. When a current or signal is applied, the second portion 302-2 is positioned into and mated with the first portion 302-1 of the rotating shaft 302. When a current or signal is removed, the second portion 302-2 retracts and decouples from the first portion 302-1 of the rotating shaft 302. In another implementation, the second portion 302-2 may be positioned into and mated with the first portion 302-1 when there is no current or signal. When a current or signal is applied, the two portions 302-1, 302-2 may decouple.

Figure 4B:
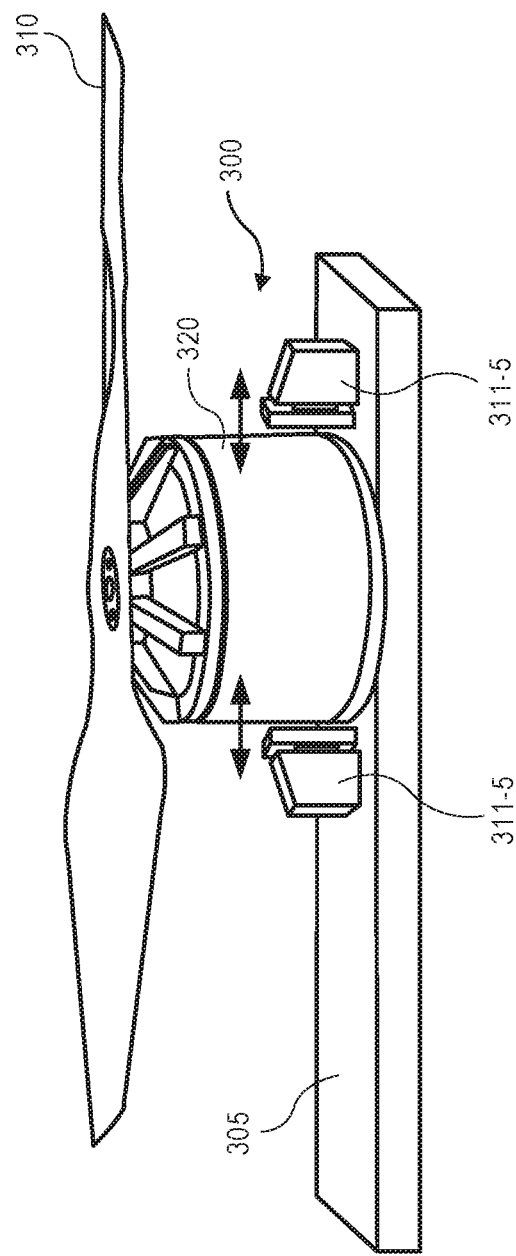
FIG. 4B is a diagram of another motor and a propeller, according to an implementation.

FIG. 4B is a diagram of another motor 300 and a propeller 310, according to an implementation to stop the rotation of the motor 300. The example configuration of FIG. 4B illustrates a stop bar(s) 311-5 that may be mounted to the motor arm 305 and deployed from a retracted position to an extended position. The stop bar(s) 311-5 may be configured with a surface area larger than the surface area of stop bar 311-4 and configured to stop the rotation of the rotor 320 using friction. For example, the stop bar(s) 311-5 may have a rubber or other similar facing surface material that, when deployed, contacts the exterior of the rotor 320 and causes the rotor 320 to stop rotating. When the stop bar(s) 311-5 is in the retracted position, the motor 300 is able to operate normally. When the stop bar 311-5 is deployed, it engages the exterior of the rotor 320 and causes the rotor 320 to stop rotating.

In some implementations, the stop bar(s) 311 may be configured as a magnetic clutch such that, when the electromagnets are charged, the stop bar(s) 311 is maintained in a retracted position and the charge of the electromagnets maintains the stop bar(s) in a retracted position. When the electromagnets are not charged, the stop bar(s) 311 may automatically deploy. In another implementation, the charge may be provided directly to the stop bar and, when a charge is received by the stop bar, it may remain in the retracted position. When the charge is removed, the stop bar(s) 311 may deploy from the retracted position to an extended position. In another implementation, the stop bar may be deployed when a charge is applied to the stop bar. When no charge is applied to the stop bar, the stop bar may remain in a retracted position.

In another example, the stop bar(s) may be controlled directly by the safety profile module 1313 (FIG. 13) and deployed in response to a command, signal or charge being provided from the safety profile module to the stop bar(s). For example, the stop bar(s) 311 may be spring actuated and deployed in response to a signal from the safety profile module 1313. In another implementation, the stop bar(s) may be deployed using air propulsion. For example, the stop bars may include a carbon dioxide cartridge that may be discharged in response to receiving a command or signal from the safety profile module 1313. When discharged, it may cause the stop bar(s) to deploy from the retracted position to an extended position. In still another example, the stop bars may be transitioned from a retracted position to an extended position using one or more pistons, e.g., pneumatic, hydraulic, electronic, etc. When the piston is retracted, the stop bars are maintained in the retracted position. When the piston is extended, the stop bars are deployed to an extended position.

In some implementations, one or more of a stop bar, disengaging the shaft, disengaging the propeller, removing the current to the motor and/or reversing the current to the motor may be utilized to stop the rotation of a propeller. The stop bars, disengaging the rotating shaft, disengaging the propeller, current removal from the motor, and reversing the current to the motor are generally referred to herein as stopping members. In some implementations, to further reduce any potential harm to the object, the propeller blades may be hinged and/or have the ability to be re-oriented. For example, the propellers may have a hinge toward the middle of the propeller blades such that the propeller blades will deflect when contact with an object occurs. If the blades have the ability to be re-oriented, when a safety profile is executed, the blades may be re-oriented approximately ninety degrees so that the flat portion of the propeller is the leading portion/edge of the propeller, rather than an edge of the propeller blade.

In still another example, the propeller may include one or more weights positioned at or near the center of the propeller during normal operation. When a safety profile is executed, the weights may be deployed such that they move in an outward direction toward an end of the propeller blades. By moving the weights out to the perimeter of the propeller, the rotational speed of the propeller is reduced.

Figure 5:
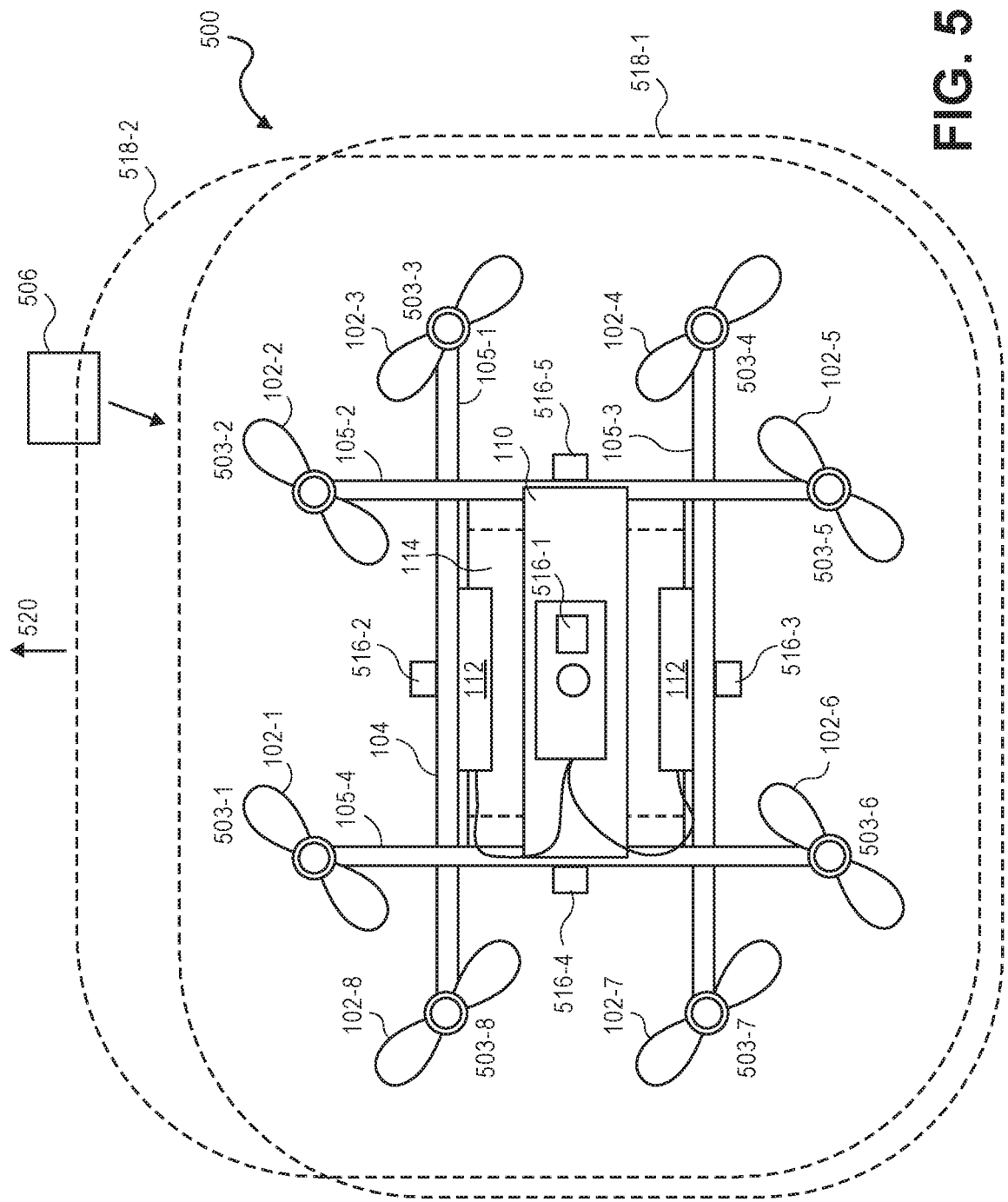
FIG. 5 depicts a block diagram of a top-down view of another aerial vehicle, according to an implementation.

FIG. 5 illustrates a block diagram of a top-down view of another aerial vehicle 500, according to an implementation. The aerial vehicle 500 may include all the features described with respect to the AAV 100 illustrated in FIG. 1, including eight propellers 102-1, 102-2, 102-3, 102-4, 102-5, 102-6, 102-7, 102-8 spaced about the frame 104 of the aerial vehicle, the frame 104 including four rigid members 105-1, 105-2, 105-3, 105-4, the aerial vehicle control system 110, the power module(s) 112, and the inventory engagement mechanism 114. The aerial vehicle control system 110, as discussed in further detail below with respect to FIG. 13, controls the operation, routing, navigation, communication, vehicle safety profile selection and implementation, and the inventory engagement mechanism of the aerial vehicle 500.

While this example includes eight propellers, in other implementations, more or fewer propellers may be utilized. Likewise, in some implementations, the propellers may be positioned at different locations on the aerial vehicle 500. In addition, alternative methods of propulsion may be utilized. For example, other propulsion mechanisms such as fans, jets, turbojets, turbo fans, jet engines, and the like may be used to propel the aerial vehicle, in place of or in combination with the propellers 102 and corresponding propeller motors. Further, the aerial vehicle may include fixed wings, other propulsion mechanisms such as fans, jets, turbojets, turbo fans, jet engines, and the like, and/or a combination of any of the above. For example, the aerial vehicle may utilize one or more propulsion mechanisms to enable takeoff and landing, and a fixed wing configuration or a combination wing and propulsion mechanism configuration to sustain flight while the aerial vehicle is airborne.

The aerial vehicle 500 may also include one or more object detection components 516. For example, FIG. 5 shows the aerial vehicle 500 including object detection components 516-1, 516-2, 516-3, 516-4, and 516-5 positioned at various locations on the aerial vehicle control system 110 and/or around the frame 104. Although FIG. 5 shows the object detection components 516 at particular locations, the object detection components 516 may be placed at any suitable locations on or around the aerial vehicle 500 in order to detect objects 506 in the environment of the aerial vehicle 500. For example, the object detection components 516 may be oriented to detect objects approaching the aerial vehicle 500 from the front, rear, right side, left side, above, below, or any other direction or combination of directions relative to the aerial vehicle 500. In addition, there may be more or fewer object detection components 516 than those shown in FIG. 5.

The object detection components 516 may comprise various types of sensors that detect objects in an environment of the aerial vehicle 500. For example, the object detection components 516 may be any one or more of an optical sensor, an imaging sensor, a thermal sensor, an infrared sensor, an ultrasonic ranging module, a laser rangefinder, a radar distance measurement module, stadiametric based rangefinder, a parallax based rangefinder, a coincidence based rangefinder, a Lidar based rangefinder, Sonar based rangefinder, or a time-of-flight based rangefinder.

Figure 6:
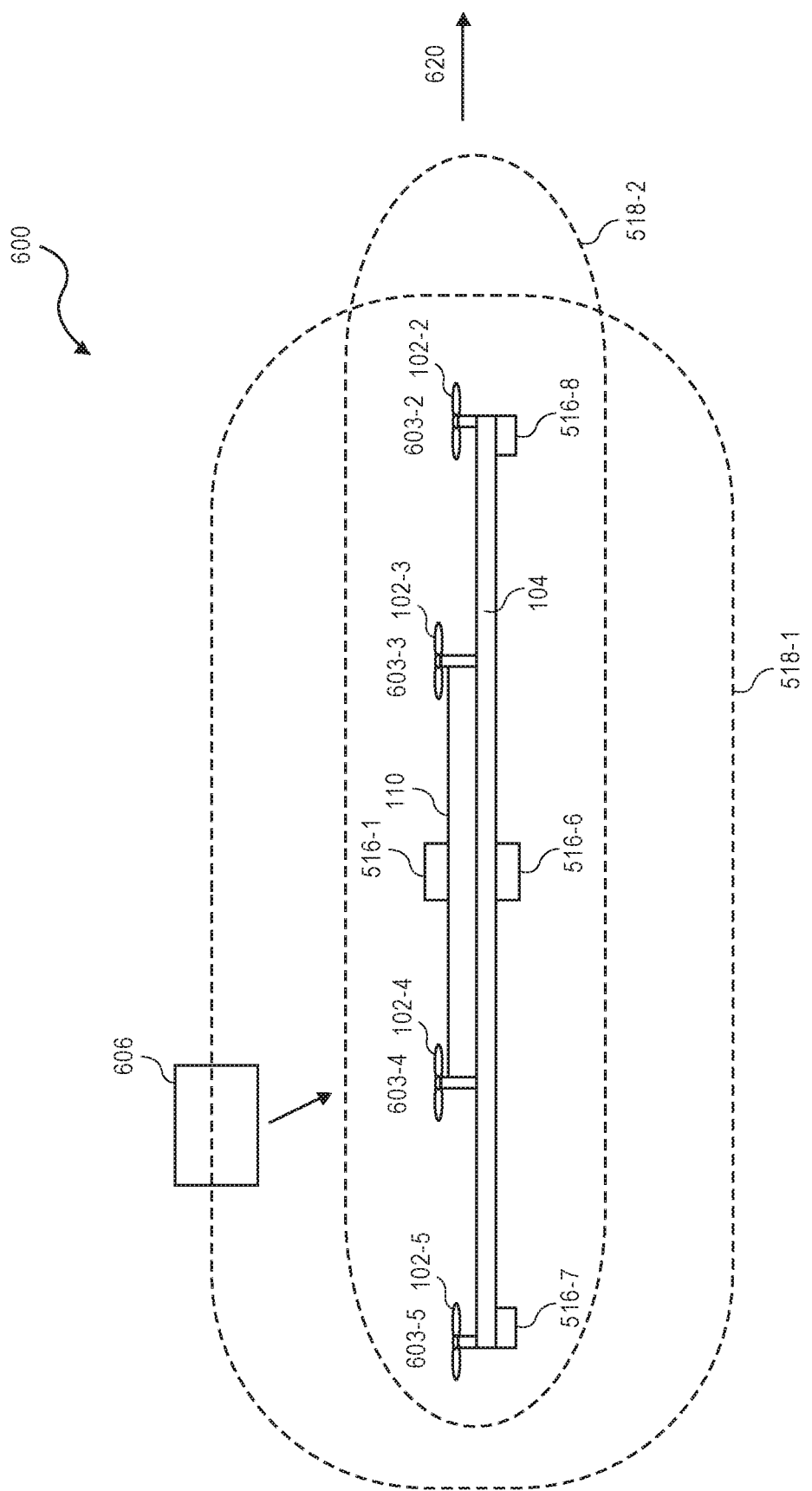
FIG. 6 depicts a block diagram of a side view of another aerial vehicle, according to an implementation.

In example implementations, the object detection components 516 and/or the object detection components 204 (FIG. 2) may be used to detect objects in the environment of the aerial vehicle, as described with respect to FIGS. 5 and 6. Likewise, the object detection components 516 and/or the object detection components 204 may be used to detect objects in proximity to one or more propellers of the aerial vehicle, as described with respect to FIGS. 2-4B.

In some implementations, the propellers and corresponding propeller motors may be configured such that the rotation of the propellers may be slowed or stopped as part of a vehicle safety profile. For example, when an object 506 approaching the aerial vehicle 500 is detected, one or more propellers closest to the approaching object 506 may be regeneratively braked to slow or stop their rotation. For example, regenerative braking may be accomplished by reversing the polarity of a DC current supplied to a motor, or by changing the phase of an AC current supplied to a motor by 180 degrees. The regenerated energy may be routed to and stored by the power module(s) 112 of the aerial vehicle 500. In other implementations, alternatively or in addition to regeneratively braking one or more propellers, the rotation of the one or more propellers may be slowed or stopped by removing the current to the corresponding motors that rotate the propellers.

The aerial vehicle control system 110 may determine and/or select a vehicle safety perimeter 518 for the aerial vehicle 500. For example, the aerial vehicle control system 110 may select from among two or more different vehicle safety perimeters 518. As shown in FIG. 5, a vehicle safety perimeter 518 may be selected based on a flight status of the aerial vehicle 500. For example, if the aerial vehicle 500 is in a hover flight mode, the vehicle safety perimeter 518-1 may be selected for the aerial vehicle 500 that provides substantially equal safety distances in any direction around the periphery of the aerial vehicle 500. Alternatively, if the aerial vehicle 500 is flying along a forward path, e.g., in the direction of arrow 520 shown in FIG. 5, the vehicle safety perimeter 518-2 may be selected for the aerial vehicle 500 that provides a larger safety distance from the leading, forward edge of the aerial vehicle 500 in the direction of travel and provides shorter safety distances from the sides, top, bottom, and/or trailing, rear edges of the aerial vehicle 500.

Although primarily two different flight statuses including hover flight mode and forward flight mode are described herein, many different flight statuses are possible that may have different, corresponding vehicle safety perimeters 518. For example, the different flight statuses may include a continuum of various flight modes such as hover flight modes at different altitudes or locations, forward flight modes in different directions or at different altitudes, speeds, or locations, transition flight modes between a hover flight mode and a forward flight mode at different altitudes, speeds, or locations, turning flight modes at different speeds, angles, and directions, etc. Moreover, as the aerial vehicle 500 transitions among the various flight modes, the corresponding vehicle safety perimeter 518 may be continuously updated or selected in accordance with a current flight status.

Furthermore, a vehicle safety perimeter 518 may be selected based on an altitude, in addition or alternatively to a flight status, of the aerial vehicle 500. For example, as described herein at least with respect to FIG. 2, an expanded vehicle safety perimeter 518 may be selected and monitored for approaching objects. An expanded vehicle safety perimeter may be selected when the aerial vehicle 500 is located in areas where an encounter with an object is more likely and/or where additional safety is desired. For example, when the aerial vehicle is landing, taking off, flying at a low altitude, near buildings, etc., an expanded vehicle safety perimeter may be selected and monitored for approaching objects. If an object is detected within the expanded vehicle safety perimeter 518, the vehicle safety profile may be automatically performed, as discussed further below.

In a similar manner, as described herein at least with respect to FIG. 2, a contracted vehicle safety perimeter may be selected and monitored for approaching objects. The contracted vehicle safety perimeter may be used when the aerial vehicle 500 is located in areas where an encounter with an object is unlikely. For example, when the aerial vehicle is in-route, traveling at a high altitude, in a controlled area (e.g., materials handling facility), etc., a contracted vehicle safety perimeter may be selected and monitored for approaching objects. If an object is detected within the contracted vehicle safety perimeter 518, the vehicle safety profile may be automatically performed, as discussed further below.

Although only two example vehicle safety perimeters 518-1 and 518-2 are shown in FIG. 5, it is contemplated that any vehicle safety perimeter may be selected from a plurality of vehicle safety perimeters that provide different safety distances to various portions of the aerial vehicle 500. In addition, although FIG. 5 shows only vehicle safety perimeters having respective safety distances within a plane of the aerial vehicle 500, the vehicle safety perimeters 518 may provide a three-dimensional safety perimeter, or safety volume, around the entire perimeter of the aerial vehicle 500, as will be clear from the illustration of FIG. 6, discussed in further detail below, in combination with FIG. 5.

In one example implementation, the aerial vehicle control system 110 may determine the flight status of the aerial vehicle 500. Based at least in part on the flight status of the aerial vehicle 500, the aerial vehicle control system 110 may select a vehicle safety perimeter 518 corresponding to the current flight status. The aerial vehicle control system 110 may receive information and/or data from the object detection components 516 that monitor an environment of the aerial vehicle 500 and process the received information to determine whether any objects 506 are approaching the aerial vehicle 500. One or more object detection components 516 may transmit data to the aerial vehicle control system 110 and based on the information received from the object detection components 516, the aerial vehicle control system 110 may determine whether an object 506 has entered the vehicle safety perimeter 518 of the aerial vehicle 500. If the object 506 is approaching the aerial vehicle 500 but has not yet entered the vehicle safety perimeter 518, the aerial vehicle control system 110 may instruct the aerial vehicle 500 to perform an avoidance maneuver. For example, the avoidance maneuver may include changing altitude, flying in any direction away from the object 506, or otherwise changing speed, course, or direction to avoid the approaching object 506.

If the object 506 has entered the vehicle safety perimeter 518, then the aerial vehicle control system 110 may instruct the aerial vehicle 500 to execute a vehicle safety profile. The vehicle safety profile may include determining an approach direction or position of the object 506 relative to the aerial vehicle, determining one or more propellers 102 that are closest to the approaching object 506, slowing or stopping rotations 503 of the one or more propellers 102 that are closest to the approaching object 506, and modifying the rotations 503 of remaining propellers 102 to maintain the flight status. Further, in addition to or alternatively to maintaining the flight status, the rotations 503 of the remaining propellers 102 may also be modified to perform an avoidance maneuver, as described herein.

For example, as shown in FIG. 5, the object 506 has entered the vehicle safety perimeter 518-2 of the aerial vehicle 500 in forward flight mode (flying in the direction of arrow 520 shown in FIG. 5). The aerial vehicle control system 110 may determine that the propeller 102-2 is closest to the approaching object, slow or stop the rotation 503-2 of the propeller 102-2 to reduce or prevent damage to the object 506 and/or the aerial vehicle 500, and modify the rotations 503-1, 503-3, 503-4, 503-5, 503-6, 503-7, 503-8 of one or more remaining propellers 102-1, 102-3, 102-4, 102-5, 102-6, 102-7, 102-8 to compensate for the slowed or stopped propeller 102-2, thereby maintaining the aerial vehicle 500 in forward flight. Further, in addition to or alternatively to maintaining the aerial vehicle 500 in forward flight, the rotations 503-1, 503-3, 503-4, 503-5, 503-6, 503-7, 503-8 of one or more remaining propellers 102-1, 102-3, 102-4, 102-5, 102-6, 102-7, 102-8 may be modified to perform an avoidance maneuver, as described herein.

Continuing with the example shown in FIG. 5, as a result of slowing or stopping the rotation 503-2 of propeller 102-2, the aerial vehicle 500 may experience changes to the forces affecting roll, pitch, yaw, heave, surge, and/or sway of the aerial vehicle, which may cause the aerial vehicle 500 to pitch forward, roll to the right, yaw either clockwise or counterclockwise, and/or heave, surge, and/or sway in a corresponding direction. Accordingly, to compensate for such changes and maintain forward flight of the aerial vehicle 500, the rotation 503-1 of propeller 102-1 may be increased to prevent pitching forward, the rotation 503-3 of propeller 102-3 may be increased to prevent rolling to the right, and/or the rotations 503-1, 503-3, 503-4, 503-5, 503-6, 503-7, 503-8 of one or more of the remaining propellers 102-1, 102-3, 102-4, 102-5, 102-6, 102-7, 102-8 may be increased to prevent yaw and/or maintain heave, surge, and/or sway. This is just one example of the thrust modifications that may be made to the remaining propellers 102-1, 102-3, 102-4, 102-5, 102-6, 102-7, 102-8, and other combinations are possible to maintain the current flight status and/or perform an avoidance maneuver, including varying levels of increasing and/or decreasing forces affecting roll, pitch, yaw, heave, surge, and/or sway at particular propellers and/or maintaining previous levels of forces affecting roll, pitch, yaw, heave, surge, and/or sway at particular propellers.

FIG. 6 illustrates a block diagram of a side view of another aerial vehicle 600, according to an implementation. Similar to the aerial vehicle 500 of FIG. 5, the aerial vehicle 600 may include all the features described with respect to the AAV 100 illustrated in FIG. 1, including eight propellers 102-1, 102-2, 102-3, 102-4, 102-5, 102-6, 102-7, 102-8 spaced about the frame 104 of the aerial vehicle, the frame 104 including four rigid members 105-1, 105-2, 105-3, 105-4, the aerial vehicle control system 110, the power module(s) 112, and the inventory engagement mechanism 114. The aerial vehicle control system 110, as discussed in further detail below with respect to FIG. 13, controls the operation, routing, navigation, communication, vehicle safety profile selection and implementation, and the inventory engagement mechanism of the aerial vehicle 600.

FIG. 6 shows object detection component 516-1 on an upper side of the aerial vehicle 600 and additional object detection components 516-6, 516-7, 516-8 on a lower side of the aerial vehicle 600. For example, object detection component 516-1 may detect objects approaching from above the aerial vehicle 600, and object detection components 516-6, 516-7, 516-8 may detect objects approaching from below the aerial vehicle 600. Although FIG. 6 shows the object detection components 516 at particular locations, the object detection components 516 may be placed at any suitable locations on or around the aerial vehicle 600 in order to detect objects 606 in the environment of the aerial vehicle 600. For example, the object detection components 516 may be oriented to detect objects approaching the aerial vehicle 600 from the front, rear, right side, left side, above, below, or any other direction or combination of directions relative to the aerial vehicle 600. In addition, there may be more or fewer object detection components 516 than those shown in FIG. 6.

The aerial vehicle control system 110 may determine and/or select a vehicle safety perimeter 518 for the aerial vehicle 600. For example, the aerial vehicle control system 110 may select from among two or more different vehicle safety perimeters 518. As shown in FIG. 6, a vehicle safety perimeter 518 may be selected based on a flight status and/or an altitude of the aerial vehicle 600. For example, if the aerial vehicle 600 is in a hover flight mode, the vehicle safety perimeter 518-1 may be selected for the aerial vehicle 600 that provides substantially equal safety distances in any direction around the periphery of the aerial vehicle 600. Alternatively, if the aerial vehicle 600 is flying along a forward path, e.g., in the direction of arrow 620 shown in FIG. 6, the vehicle safety perimeter 518-2 may be selected for the aerial vehicle 600 that provides a larger safety distance from the leading, forward edge of the aerial vehicle 600 in the direction of travel and provides shorter safety distances from the sides, top, bottom, and/or trailing, rear edges of the aerial vehicle 600.

Although primarily two different flight statuses including hover flight mode and forward flight mode are described herein, many different flight statuses are possible that may have different, corresponding vehicle safety perimeters 518. For example, the different flight statuses may include a continuum of various flight modes such as hover flight modes at different altitudes or locations, forward flight modes in different directions or at different altitudes, speeds, or locations, transition flight modes between a hover flight mode and a forward flight mode at different altitudes, speeds, or locations, turning flight modes at different speeds, angles, and directions, etc. Moreover, as the aerial vehicle 600 transitions among the various flight modes, the corresponding vehicle safety perimeter 518 may be continuously updated or selected in accordance with a current flight status.

Although only two example vehicle safety perimeters 518-1 and 518-2 are shown in FIG. 6, it is contemplated that any vehicle safety perimeter may be selected from a plurality of vehicle safety perimeters that provide different safety distances to various portions of the aerial vehicle 600. In addition, FIGS. 5 and 6 in combination show that the vehicle safety perimeters 518 may provide a three-dimensional safety perimeter, or safety volume, around the entire perimeter of the aerial vehicle 600.

In one example implementation, the aerial vehicle control system 110 may determine the flight status of the aerial vehicle 600. Based at least in part on the flight status of the aerial vehicle 600, the aerial vehicle control system 110 may select a vehicle safety perimeter 518 corresponding to the current flight status. The aerial vehicle control system 110 may receive information and/or data from the object detection components 516 that are monitoring an environment of the aerial vehicle 600 and process the received information to determine whether any objects 606 are approaching the aerial vehicle 600. One or more object detection components 516 may transmit data to the aerial vehicle control system 110 and based on the information received from the object detection components 516, the aerial vehicle control system 110 may determine whether an object 606 has entered the vehicle safety perimeter 518 of the aerial vehicle 600. If the object 606 is approaching the aerial vehicle 600 but has not yet entered the vehicle safety perimeter 518, the aerial vehicle control system 110 may instruct the aerial vehicle 600 to perform an avoidance maneuver. For example, the avoidance maneuver may include changing altitude, flying in any direction away from the object 606, or otherwise changing speed, course, or direction to avoid the approaching object 606.

If the object 606 has entered the vehicle safety perimeter 518, then the aerial vehicle control system 110 may instruct the aerial vehicle 600 to execute a vehicle safety profile. The vehicle safety profile may include determining an approach direction or position of the object 606 relative to the aerial vehicle, determining one or more propellers 102 that are closest to the approaching object 606, slowing or stopping rotations 603 of the one or more propellers 102 that are closest to the approaching object 606, and modifying the rotations 603 of remaining propellers 102 to maintain the flight status. Further, in addition to or alternatively to maintaining the flight status, the rotations 603 of the remaining propellers 102 may also be modified to perform an avoidance maneuver, as described herein.

For example, as shown in FIG. 6, the object 606 has entered the vehicle safety perimeter 518-1 of the aerial vehicle 600 in hover flight mode. The aerial vehicle control system 110 may determine that the propeller 102-4 is closest to the approaching object, slow or stop the rotation 603-4 of the propeller 102-4 to reduce or prevent damage to the object 606 and/or the aerial vehicle 600, and modify the rotations 603-1, 603-2, 603-3, 603-5, 603-6, 603-7, 603-8 of one or more remaining propellers 102-1, 102-2, 102-3, 102-5, 102-6, 102-7, 102-8 to compensate for the slowed or stopped propeller 102-4, thereby maintaining the aerial vehicle 600 in hover flight mode. Further, in addition to or alternatively to maintaining the aerial vehicle 600 in hover flight mode, the rotations 603-1, 603-2, 603-3, 603-5, 603-6, 603-7, 603-8 of one or more remaining propellers 102-1, 102-2, 102-3, 102-5, 102-6, 102-7, 102-8 may be modified to perform an avoidance maneuver, as described herein.

Continuing with the example shown in FIG. 6, as a result of slowing or stopping the rotation 603-4 of propeller 102-4, the aerial vehicle 600 may experience changes to the forces affecting roll, pitch, yaw, heave, surge, and/or sway of the aerial vehicle, which may cause the aerial vehicle 600 to pitch rearward, roll to the right, yaw either clockwise or counterclockwise, and/or heave, surge, and/or sway in a corresponding direction. Accordingly, to compensate for such changes and maintain hover flight of the aerial vehicle 600, the rotation 603-5 of propeller 102-5 may be increased to prevent pitching rearward, the rotation 603-3 of propeller 102-3 may be increased to prevent rolling to the right, and/or the rotations 603-1, 603-2, 603-3, 603-5, 603-6, 603-7, 603-8 of one or more of the remaining propellers 102-1, 102-2, 102-3, 102-5, 102-6, 102-7, 102-8 may be increased to prevent yaw and/or maintain heave, surge, and/or sway. This is just one example of the thrust modifications that may be made to the remaining propellers 102-1, 102-2, 102-3, 102-5, 102-6, 102-7, 102-8, and other combinations are possible to maintain the current flight status and/or perform an avoidance maneuver, including varying levels of increasing and/or decreasing forces affecting roll, pitch, yaw, heave, surge, and/or sway at particular propellers and/or maintaining previous levels of forces affecting roll, pitch, yaw, heave, surge, and/or sway at particular propellers.

The aerial vehicle control system 110 may determine and/or select from one or more mixers. A mixer may define thrust parameters for each propeller and corresponding propeller motor (or each propulsion mechanism) to maintain a current flight status and/or perform an avoidance maneuver. For example, for the aerial vehicles 500, 600 in FIGS. 5 and 6 having eight propellers and corresponding propeller motors, one example mixer may define thrust parameters for each of the eight propellers to maintain a hover flight mode. A second example mixer may define thrust parameters for each of the eight propellers to maintain a forward flight mode at a defined speed. In addition, a third example mixer may define thrust parameters for each of seven propellers, responsive to one of the propellers being stopped due to a detected approaching object, to maintain a hover flight mode. Similarly, a fourth example mixer may define thrust parameters for each of seven propellers, responsive to one of the propellers being stopped due to a detected approaching object, to maintain a forward flight mode at a defined speed. Other example mixers may define different thrust parameters to maintain particular flight modes and/or perform avoidance maneuvers for other combinations of propellers, e.g., six rotating propellers and two slowed/stopped propellers, five rotating propellers and three slowed/stopped propellers, four rotating propellers and four slowed/stopped propellers, etc.

In addition, for any one specific combination of propellers, e.g., seven rotating propellers 102-1, 102-2, 102-3, 102-4, 102-5, 102-6, 102-7 and one stopped propeller 102-8, there may be multiple, different mixers available to operate the seven rotating propellers 102-1, 102-2, 102-3, 102-4, 102-5, 102-6, 102-7 in a manner to maintain a current flight status and/or perform an avoidance maneuver. Likewise, for different combinations of propellers, e.g., seven rotating propellers 102-1, 102-2, 102-3, 102-4, 102-5, 102-6, 102-7 and one stopped propeller 102-8 vs. one stopped propeller 102-7 and seven rotating propellers 102-1, 102-2, 102-3, 102-4, 102-5, 102-6, 102-8, similar or identical mixers may be available for the different combinations of propellers to operate the rotating propellers in a manner to maintain a current flight status and/or perform an avoidance maneuver.

Further, an aerial vehicle may, in response to stopping one propeller due to an approaching object, proactively stop one or more additional propellers (even if such propellers are not necessarily in the path of the approaching object) in order to operate in a more preferred vehicle configuration with a correspondingly preferred mixer. For example, if the aerial vehicle is an octocopter that detects an approaching object and stops a first propeller closest to the approaching object, a second propeller, e.g., on an opposite side of the aerial vehicle from the first propeller, may be proactively stopped in order to preferentially operate as a hexacopter using a corresponding mixer (or second, third, and fourth propellers, e.g., equally spaced around the aerial vehicle, may be proactively stopped in order to preferentially operate as a quadcopter using a corresponding mixer). Likewise, a hexacopter that detects an approaching object and stops a first propeller closest to the approaching object may proactively stop a second propeller, e.g., on an opposite side of the aerial vehicle from the first propeller, in order to preferentially operate as a quadcopter using a corresponding mixer.

The thrust parameters of each mixer may be achieved in various manners. For example, for propulsion mechanisms utilizing propellers and corresponding propeller motors, the thrust parameters may be altered by changing a current or voltage supplied to a propeller motor, thereby changing a speed at which the propeller rotates. In addition to altering thrust parameters by such electrical control, the thrust parameters of propellers may also be altered by changing mechanical properties of the propellers themselves, such as by changing the pitch of one or more blades of the propeller(s) or by altering an orientation of the propeller(s) relative to the aerial vehicle. The thrust parameters of other propulsion mechanisms may also be altered by changing the provided electrical signals, e.g., providing an electrical command to increase/decrease the rotational speed of a jet engine, or by changing mechanical properties of the propulsion mechanisms, e.g., changing an orientation of the jet engine relative to the aerial vehicle.

In order to maintain stable control of an aerial vehicle in a particular flight mode, it is generally necessary to control each of the three degrees of freedom of rotation: roll, pitch, and yaw, and each of the three degrees of freedom of translation: heave, surge, and sway. For example, in order to maintain an aerial vehicle in stable hover flight mode, the sum of all forces affecting roll from the propulsion mechanisms should be substantially zero, the sum of all forces affecting pitch from the propulsion mechanisms should be substantially zero, the sum of all forces affecting yaw from the propulsion mechanisms should be substantially zero, the sum of all forces affecting heave from the propulsion mechanisms should be substantially equal to the weight of the aerial vehicle, the sum of all forces affecting surge from the propulsion mechanisms should be substantially zero, and the sum of all forces affecting sway from the propulsion mechanisms should be substantially zero. Thus, when one or more propulsion mechanisms are slowed or stopped due to a detected approaching object, the remaining propulsion mechanisms should be modified to maintain the overall combination of forces affecting roll, pitch, yaw, heave, surge, and sway in order to maintain the current flight status and/or perform an avoidance maneuver. In other words, the aerial vehicle control system 110 may select a new mixer to maintain a current flight status and/or perform an avoidance maneuver responsive to changes to the combination of propulsion mechanisms that are available.

Additionally, it may be possible to cede control of one of the degrees of freedom, e.g., yaw, and still maintain hover flight mode. In this example, by maintaining control over roll, pitch, heave, surge, and sway, an aerial vehicle may maintain hovering flight but may experience a non-zero sum of forces affecting yaw, e.g., a relatively constant spin. For example, a quadcopter in hover flight mode that stops one propeller responsive to detecting an approaching object may be able to maintain hovering flight with the remaining three propellers but experience a relatively constant spin, by maintaining control over the forces affecting roll, pitch, heave, surge, and sway with the remaining three propellers. Further, although it may be possible to cede control of more than one of the degrees of freedom and still maintain some level of control over the aerial vehicle, maintaining stable control of the aerial vehicle may become increasingly difficult with an increasing number of uncontrolled degrees of freedom.

If, responsive to slowing or stopping one or more propulsion mechanisms, a mixer is not available to maintain an aerial vehicle in its current flight status, e.g., forward flight at a defined speed, then the aerial vehicle control system 110 may select a best available mixer in order to effect a controlled descent of the aerial vehicle. For example, a hexacopter in forward flight mode that stops three propellers responsive to detecting one or more approaching objects may not be able to maintain its forward flight and may instead use the remaining three propellers to effect a controlled descent.

Further, if the aerial vehicle control system 110 detects that any approaching objects have exited the vehicle safety perimeter, the aerial vehicle control system 110 may select a new mixer or revert back to the previous mixer that was used before detecting any approaching objects. For example, if an octocopter had stopped one propeller due to an approaching object and the object has now exited the vehicle safety perimeter, the aerial vehicle control system 110 may select a new mixer (or revert back to the previous mixer) that utilizes all eight propellers to resume its current flight status. Likewise, for the example above in which a hexacopter has detected an approaching object and selected a mixer using three propellers to effect a controlled descent, upon determining that the object has exited the vehicle safety perimeter, the aerial vehicle control system 110 may select a new mixer (or revert back to the previous mixer) that utilizes all six propellers of the hexacopter to resume its previous flight status, e.g., forward flight mode.

Figure 7:
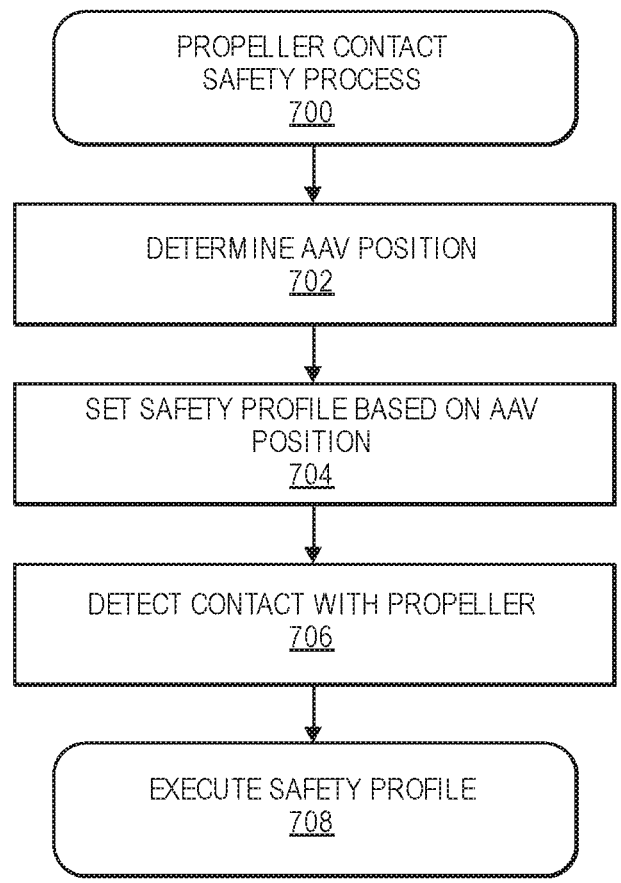
FIG. 7 is a flow diagram illustrating an example propeller contact safety process, according to an implementation.

FIG. 7 is a flow diagram illustrating an example propeller contact safety process 700, according to an implementation. This process, and each process described herein, may be implemented by the architectures described herein or by other architectures. The process is illustrated as a collection of blocks in a logical flow. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process. Additionally, one or more of the operations may be considered optional and/or not utilized with other operations.

The example process 700 begins by determining a position of the AAV, as in 702. For example, the navigation system 1308 (FIG. 13) may include a location determining element, such as a global positioning satellite (GPS) system that can be used to determine the location of the AAV. The navigation system 1308 may also be able to determine the altitude and/or speed of the AAV. In some implementations, the AAV may have information about the area in which the AAV is located (e.g., are there buildings, is it a secured area, such as a materials handling facility, whether the AAV is at an area populated by humans, such as a neighborhood). Information about the area surrounding the AAV may be stored in a memory of the AAV, provided to the AAV by other AAVs that have been or are in the area, provided by the AAV management system, etc.

Based on the determined AAV position, a safety profile may be selected for the AAV, as in 704. In this example, the safety profile may define an action or set of actions that are to be automatically performed if a contact with a propeller of the AAV is detected. In some implementations, the safety profile may vary based on the position of the AAV. Different safety profiles may include different actions that are to be performed by the AAV when a contact with a propeller is detected. For example, a first safety profile, also referred to herein as a near surface safety profile, may be defined in which the AAV shuts off all motors and stops rotation of all propellers of the AAV when a contact with any one of the propellers of the AAV is detected. Such a safety profile may be selected when the AAV is landed and/or near a surface (e.g., when the AAV is performing a landing or takeoff from the surface) on which it is capable of landing. In some implementations, the first safety profile may only be utilized when the AAV is landed or near a surface upon which it can land because stopping all the propellers will cause the AAV to lose the ability to maintain flight.

In a second safety profile, also referred to herein as a transition safety profile, the actions that are automatically performed in response to detecting a contact with a propeller by an object may include stopping the rotation of the propeller that detected the contact and, in some AAV configurations, stopping the rotation of adjacent propellers. For example, if the AAV has six or more propellers, the safety profile may cause the propeller that detected the contact with the object and the two propellers adjacent to the propeller that detected the contact with the object to stop rotating. If the AAV has only four propellers, the safety profile may only stop the one propeller that detected the contact with the object.

The actions of the selected safety profile may also include altering the rotation of one or more of the propellers that are not stopped in a manner that will cause the AAV to move or navigate away from the object and/or land the AAV on a nearby surface.

The transition safety profile may be selected when the AAV is transitioning from a takeoff to an open area or when the AAV is transitioning from an open area to a landing. In some implementations, the transition safety profile may also be used in other locations. For example, if the AAV is located in a controlled environment, such as a materials handling facility, it may utilize the transition safety profile while in the controlled environment. Likewise, if the AAV is in an area with multiple objects, an area known to often have objects and/or an area where contact with an object may be more likely, it may operate in a transition safety profile.

In still another example, a third safety profile, also referred to herein as an open area safety profile, may be selected. An open area safety profile may be selected when the AAV is in an area with no or few objects, at a high altitude, traveling at a high speed and/or in an area where an encounter with an object is not likely. For example, if the AAV is at an altitude of five hundred feet and traveling over a non-populated area, the AAV may utilize an open area safety profile. The open area safety profile may specify automatic actions of stopping the propeller that detected a contact with an object and altering the rotation of the propellers that were not stopped to navigate the AAV away from the object.

While the above examples identify three different safety profiles, in other implementations, additional or fewer safety profiles may be utilized with the implementations described herein. Likewise, the safety profiles may include fewer or additional actions that are automatically performed in response to detecting a contact with a propeller by an object. For example, the AAV may only be configured to automatically stop the rotation of a propeller when a contact with an object is detected.

Upon selection of a safety profile, the AAV may continuously monitor for a contact with a propeller of the AAV by an object, as in 706. For example, as discussed above, the propellers may be formed of an electrically conductive material and the conductance through the propeller or the capacitance of the propeller may be monitored. When a change in the conductance and/or capacitance is detected, it may be determined that the propeller has been contacted by an object. As another example, the force applied to the propellers may be monitored and, if the external forces exceed those that are typically encountered (e.g., wind), it may be determined that the propeller has been contacted by an object.

If it is determined that the propeller has been contacted by an object, the selected safety profile is automatically executed, as in 708. For example, if the first safety profile has been selected, upon detection of a contact, all of the propellers of the AAV may stop rotating, causing the AAV to drop to a surface. In addition, in some implementations, an audio output by the AAV may be initiated. For example, after the AAV propellers have stopped, the AAV may emit an audio signal that the AAV has stopped and is contacting the AAV management system. In another implementation, the AAV may provide an audio signal that includes contact information that an individual may utilize to provide a notification of the landed AAV. Any audio may be output by the AAV.

In still another implementation, the AAV may contact the AAV management system to notify the AAV management system of its location and that the safety profile has been executed.

Figure 8:
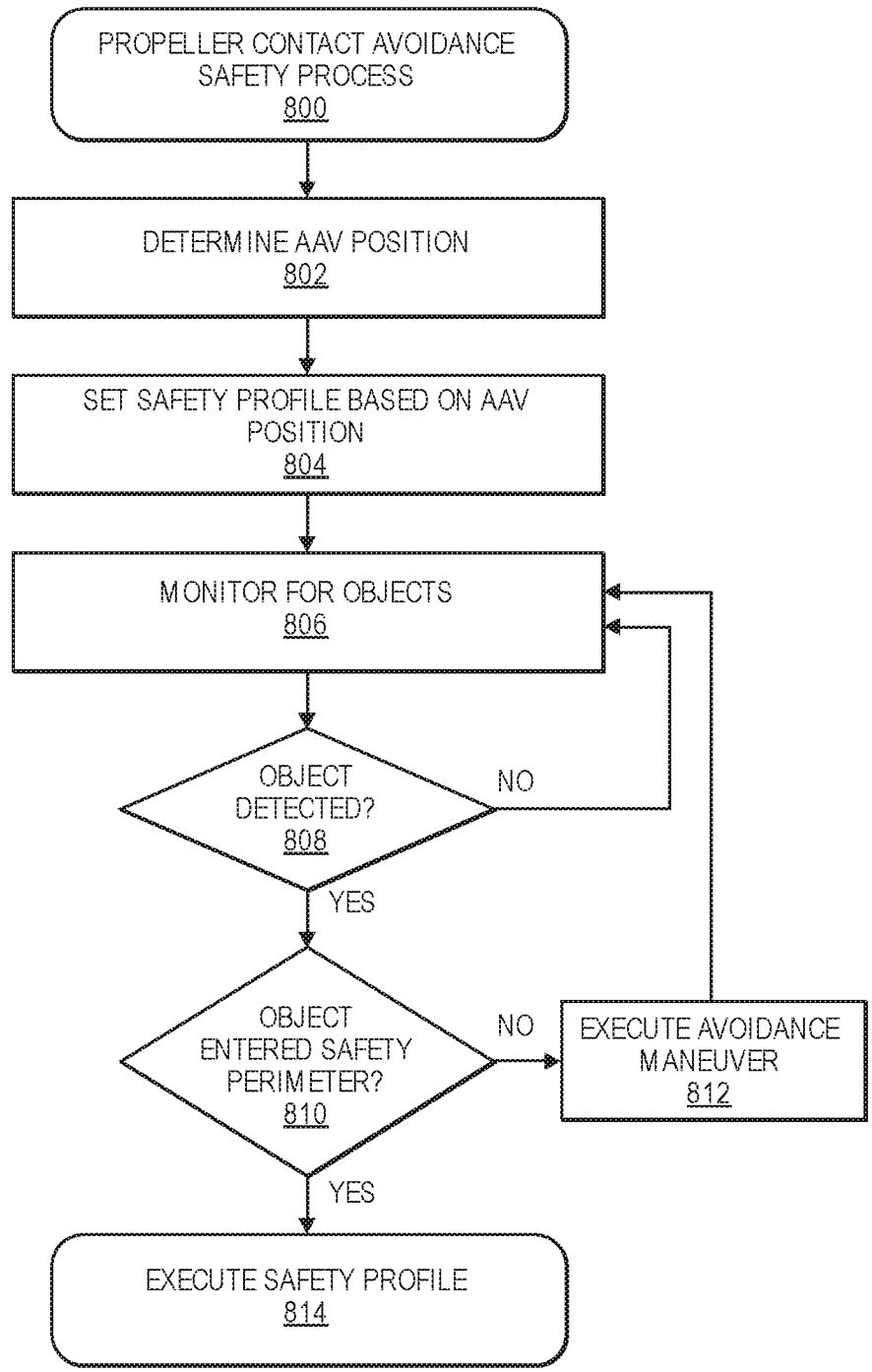
FIG. 8 is a flow diagram illustrating an example propeller contact avoidance safety process, according to an implementation.

FIG. 8 is a flow diagram illustrating an example propeller contact avoidance safety process 800, according to an implementation. The propeller contact avoidance process 800 begins by determining a position of the AAV, as in 802. For example, the navigation system 1308 (FIG. 13) may include a location determining element, such as a global positioning satellite (GPS) system that can be used to determine the location of the AAV. The navigation system 1308 may also be able to determine the altitude and/or speed of the AAV. In some implementations, the AAV may have information about the area in which the AAV is located (e.g., are there buildings, is it a secured area (such as a materials handling facility), is it an area populated by humans (such as a neighborhood)). Information about the area surrounding the AAV may be stored in a memory of the AAV, provided to the AAV by other AAVs that have been, or are in the area, provided by the AAV management system, etc.

Based on the determined AAV position, a safety profile may be selected for the AAV, as in 804. In this example, the safety profile may define an action or set of actions that are to be automatically performed if an object is detected, if an object enters a defined safety perimeter (also referred to as an imminent contact), and/or if a contact with a propeller of the AAV is detected. In some implementations, the safety profile may vary based on the position of the AAV. Different safety profiles may include different actions that are to be performed by the AAV when an object is detected, when an imminent contact with an object is detected, and/or when a contact with a propeller is detected. For example, a first safety profile, also referred to herein as a near surface safety profile, may be defined in which the AAV monitors for an object entering an expanded safety perimeter surrounding the propellers of the AAV and, if an object is detected entering the expanded safety perimeter, the AAV shuts off all motors and stops rotation of all propellers of the AAV. Such a safety profile may be selected when the AAV is landed and/or near a surface (e.g., when the AAV is performing a landing or takeoff from the surface) on which it is capable of landing. In some implementations, the first safety profile may only be utilized when the AAV is landed or near a surface upon which it can land because stopping all the propellers will cause the AAV to lose the ability to maintain flight.

In a second safety profile, also referred to herein as a transition safety profile, the AAV may continuously monitor for an object entering a transition safety perimeter. The transition safety perimeter may be a perimeter that extends farther away from the ends of the propeller than the contracted safety perimeter but less than the distance of the expanded safety perimeter. If an object is detected entering the transition safety perimeter, the rotation of the propeller nearest the detected object may be stopped. In some AAV configurations, the rotation of adjacent propellers may also be stopped. For example, if the AAV has six or more propellers, the safety profile may cause the propeller nearest the detected object and the two propellers adjacent to the propeller nearest the detected object to stop rotating. If the AAV has only four propellers, the safety profile may only stop the one propeller that is nearest the detected object, so that navigation control and flight may be maintained by the remaining three propellers.

The actions of the selected safety profile may also include altering the rotation of one or more of the propellers that were not stopped in a manner that will cause the AAV to move or navigate away from the detected object and/or land the AAV on a nearby surface.

The transition safety profile may be selected when the AAV is transitioning from a takeoff to an open area or when the AAV is transitioning from an open area to a landing. In some implementations, the transition safety profile may also be used in other locations. For example, if the AAV is located in a controlled environment, such as a materials handling facility, it may utilize the transition safety profile while in the controlled environment. Likewise, if the AAV is in an area with multiple objects, an area known to often have objects and/or an area where contact with an object may be more likely, it may operate in a transition safety profile.

In still another example, the third safety profile, also referred to herein as an open area safety profile, may be selected. An open area safety profile may be selected when the AAV is an area with no or few objects, at a high altitude, traveling at a high speed and/or in an area where an encounter with an object is not likely. For example, if the AAV is at an altitude of five hundred feet and traveling over a non-populated area, the AAV may utilize an open area safety profile. In the open area safety profile, the AAV may continuously monitor for an object entering a contracted safety perimeter, and the open area safety profile may specify automatic actions that are to be performed when an object is detected entering the contracted safety perimeter. For example, the automatic actions may include stopping the propeller that is nearest a detected object and altering the rotation of the propellers that are not stopped to navigate the AAV away from the object.

While the above examples identify three different safety profiles, in other implementations, additional or fewer safety profiles may be utilized with the implementations described herein. Likewise, the safety profiles may include fewer or additional actions that are automatically performed in response to detecting an object entering a safety perimeter.

Upon selection of a safety profile, the example process 800 may monitor for an object, as in 806. In some implementations, the example process 800 may monitor for any object that is detectable by one or more object detection components of the AAV. In another implementation, the example process 800 may only monitor for objects entering the safety perimeter specified for the selected safety profile.

As the example process monitors for objects, a determination is made as to whether an object has been detected, as in 808. If an object is not detected, the example process returns to block 806 and continues. However, if an object is detected, a determination is made as to whether the detected object has entered the safety perimeter specified by the safety profile, as in 810. For example, if the distance between the object and a propeller of the AAV is less than a safety perimeter distance from the propeller of the AAV, it is determined that the object has entered the safety perimeter.

If it is determined that the detected object has not yet entered the safety perimeter specified by the safety profile, one or more avoidance maneuvers may be performed in an effort to prevent the object from entering the safety perimeter, as in 812. For example, the rotation of the propellers may be altered to cause the AAV to navigate away from a position of the detected object. In another example, the AAV may stop movement and loiter at its current position, so that it can continue monitoring the position of the object. If the object continues to approach the AAV, the AAV may then navigate away from the position of the detected object. Navigation away from the detected object may include moving the AAV in a direction opposite the position of the detected object and/or moving in a direction that is farther away from a nearby surface. For example, if the object is potentially a human, pet or other animal that is approaching the AAV from the ground, in addition to moving away from the direction of the object, the AAV may move vertically away from the ground to further distance itself from the object and reduce the potential of a contact between the propeller of the AAV and the object.

If it is determined that the detected object has entered the safety perimeter of one of the propellers of the AAV, the selected safety profile is performed, as in 814. For example, if the first safety profile has been selected, upon detection of an object entering the contracted safety perimeter, all of the propellers of the AAV may stop rotating, causing the AAV to drop to a surface. In addition, in some implementations, an audio output by the AAV may be initiated. For example, after the AAV propellers have stopped, the AAV may emit an audio signal that the AAV has stopped and is contacting the AAV management system. In another implementation, the AAV may provide an audio signal that includes contact information that an individual may utilize to provide a notification of the grounded AAV. Any audio may be output by the AAV.

In still another implementation, the AAV may contact the AAV management system to notify the AAV management system of its location and that the safety profile has been executed.

Figure 9:
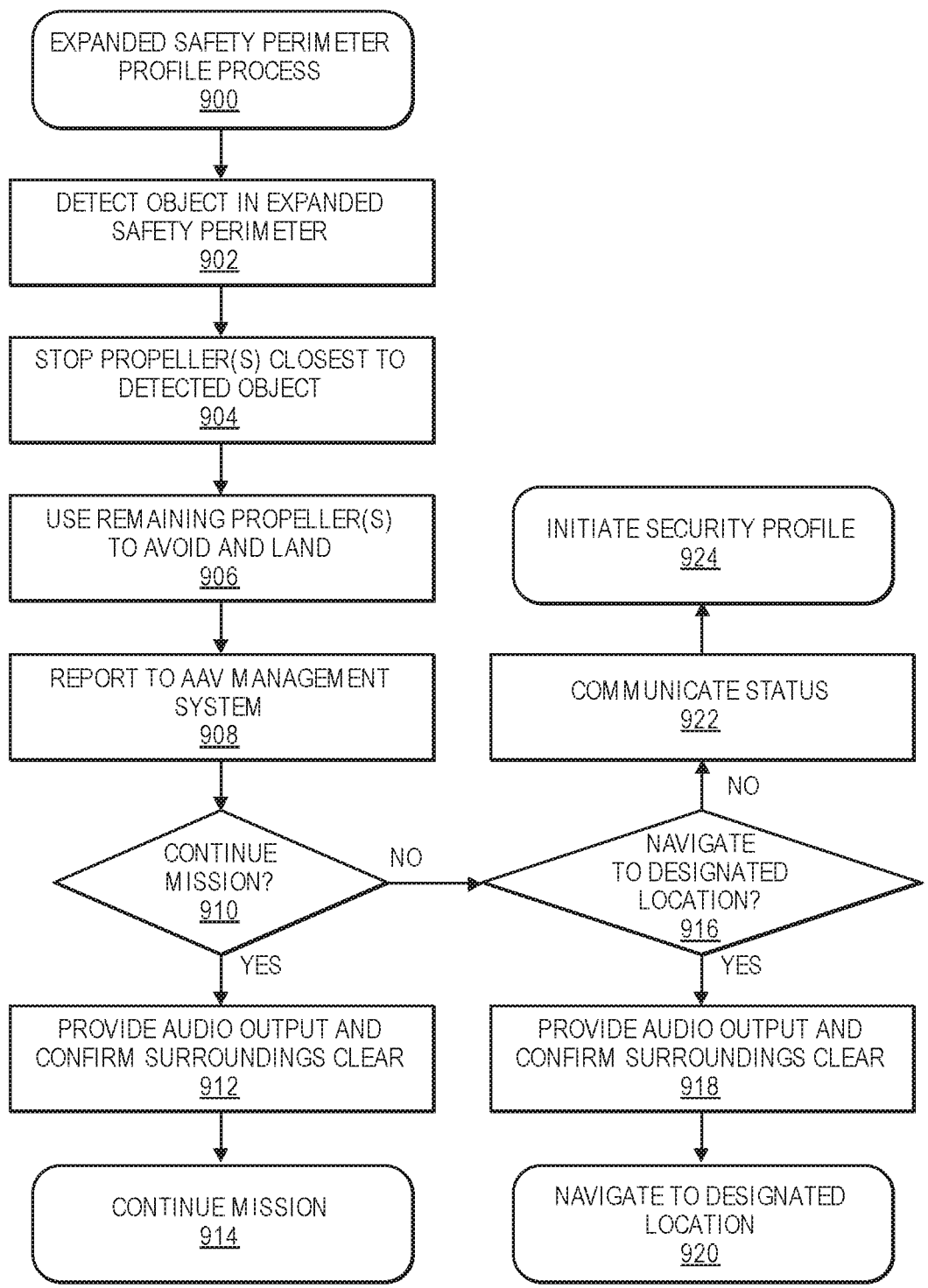
FIG. 9 is a flow diagram illustrating an example expanded safety perimeter profile process, according to an implementation.
Figure 10:
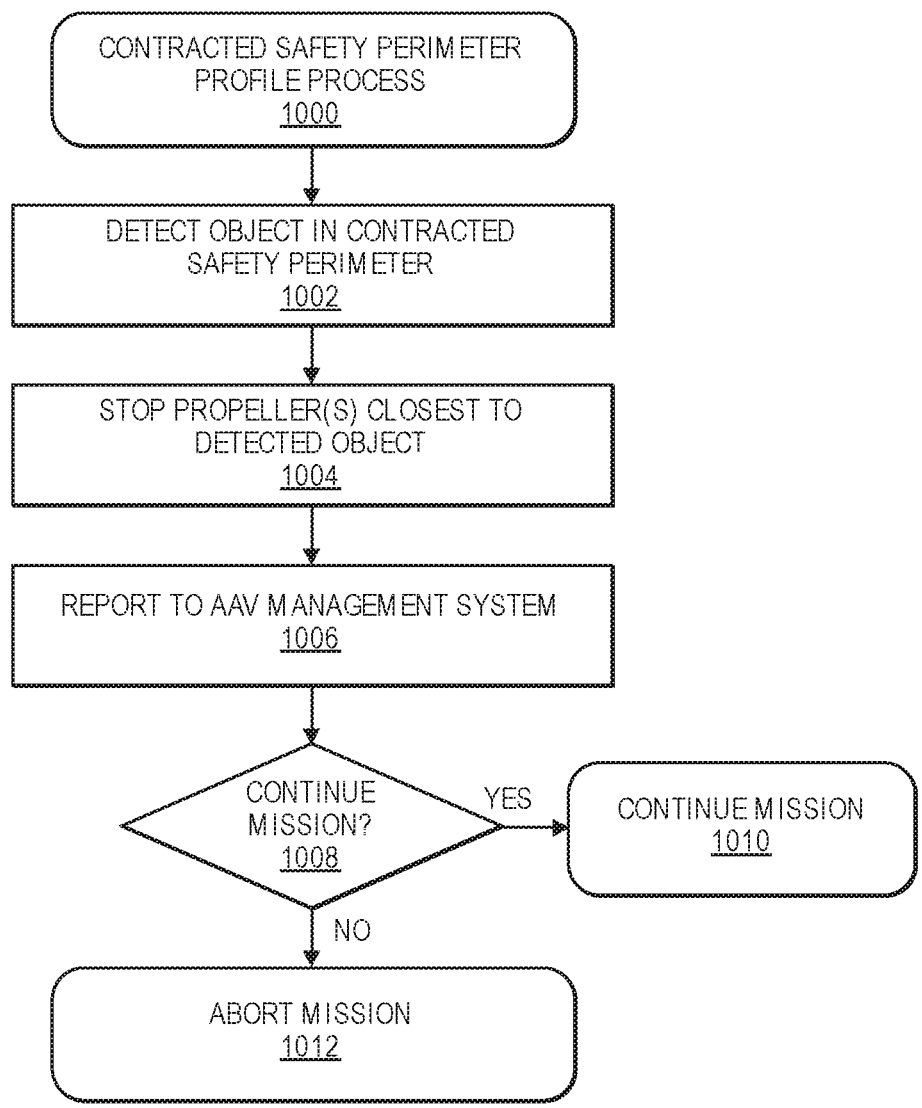
FIG. 10 is a flow diagram illustrating an example contracted safety perimeter profile process, according to an implementation.

As discussed above, object detection components may be used to monitor for objects entering a defined safety perimeter and different safety perimeters may be specified for different safety profiles. When an object is detected as entering a defined safety perimeter, a safety profile is automatically executed to reduce and/or avoid any contact or harm to the object. Multiple safety profiles and corresponding perimeters may be specified and used with the implementations discussed herein. FIGS. 9-10 provide examples of an expanded safety profile and a contracted safety profile that may be performed when an object is detected as entering an expanded safety perimeter or a contracted safety perimeter, respectively.

For example, FIG. 9 is a flow diagram illustrating an expanded safety perimeter profile process 900, according to an implementation. The example process 900 begins by detecting an object in an expanded safety perimeter, as in 902. For example, an object detection component may detect an object and determine a distance between the object and the object detection component. That information may be used to determine if the object has entered the expanded safety perimeter. When an object is determined to be within the expanded safety perimeter (an imminent contact), the rotation of the propeller(s) closest to the object may be stopped, as in 904. Likewise, the propellers that were not stopped may be used to navigate the AAV away from a position of the object and land the AAV on a nearby surface, as in 906. In addition to navigating away from the position of the object and landing the AAV, the AAV may also report to the AAV management system that the expanded safety profile has been executed, as in 908. The report to the AAV management system may include an identification of the AAV, the location of the AAV, information relating to the detected object, the position and/or altitude of the AAV, etc.

In some implementations, a determination may also be made as to whether the AAV should continue the mission (e.g., delivery of a package to a user specified location), as in 910. For example, after the AAV has landed, it may perform a self-check to confirm that no components of the AAV are malfunctioning, that the motors of the AAV are operating properly and that the propellers are intact and functional.

If it is determined that the AAV is to complete the mission, the AAV may provide an audio output notifying the surrounding area that it is preparing to take off and/or may confirm that the area surrounding the AAV is clear for takeoff, as in 912. For example, the object detection components may be used to determine if the object is still present and/or if there are any other objects near the AAV that may come into contact with a propeller of the AAV. After emitting an audio output and/or confirming that the surroundings are clear, the AAV may take off from its current location and continue its mission, as in 914. For example, if the mission is to deliver a package to a user specified location, the AAV may take off from its current location and continue navigating toward the user specified location.

Returning to decision block 910, if it is determined that the AAV is not to continue its mission, a determination is made as to whether the AAV is to navigate to a designated location, such as a relay location or a nearby materials handling facility, as in 916. If it is determined that the AAV is to navigate to a designated location, the AAV may provide an audio output notifying the surrounding area that it is preparing to take off and/or may confirm that the area surrounding the AAV is clear for takeoff, as in 918. For example, the object detection components may be used to determine if the object is still present and/or if there are any other objects near the AAV that may come into contact with a propeller of the AAV. After emitting an audio output and/or confirming that the surroundings are clear, the AAV may take off from its current location and navigate to a designated location, as in 920. The designated location may be any defined location and/or a location provided by the AAV management system. For example, in response to receiving a notification from the AAV that it has executed a safety profile, it may provide a designated location to the AAV and the AAV may navigate to the provided designated location.

If it is determined at decision block 916 that the AAV is not to navigate to a designated location, the AAV may communicate status information to the AAV management system, as in 922. The status information may include a position of the AAV, the payload carried by the AAV, images of the object that was detected near the AAV, an audio or video feed of the area surrounding the AAV, etc. Likewise, a security profile for the AAV may be initiated, as in 924. The security profile may be any procedures that are performed to protect the AAV and/or the payload carried by the AAV. For example, the security profile may include the AAV recording audio and/or video of the area surrounding the AAV, providing audio and/or video of the area surrounding the AAV to the AAV management system, providing a notification to a customer that was expecting a payload to be delivered by the AAV, emitting an audio signal or warning, and/or transmitting a beacon to enable retrieval of the AAV, etc.

FIG. 10 is a flow diagram illustrating an example contracted safety perimeter profile process 1000, according to an implementation. The example contracted safety perimeter profile process 1000 is similar to the expanded safety perimeter profile process but may have different actions that are automatically performed and/or may have a different safety perimeter specified for the contracted safety profile.

The example process 1000 begins by detecting an object in a contracted safety perimeter, as in 1002. For example, an object detection component may detect an object and determine a distance between the object and the object detection component. That information may be used to determine if the object has entered the contracted safety perimeter. When an object is determined to be within the contracted safety perimeter (imminent contact), the rotation of the propeller(s) closest to the object may be stopped, as in 1004. In some implementations, the example process 1000 may also utilize the propellers of the AAV that are not stopped to navigate the AAV away from the detected object. In comparison to the expanded safety perimeter profile, which may be selected when the AAV is at a low altitude and/or in an area where an object is likely to be encountered, the contracted safety perimeter profile may be selected when the AAV is at a high altitude, in an area where an encounter with an object is not expected, and/or in a controlled area, such as a materials handling facility.

In addition to stopping the propeller closest to the detected object, the AAV may also report to the AAV management system that the contracted safety profile has been executed, as in 1006. The report to the AAV management system may include an identification of the AAV, the location of the AAV, information relating to the detected object, the position and/or altitude of the AAV, etc.

In some implementations, a determination may also be made as to whether the AAV should complete the mission, as in 1008. For example, if the AAV did not contact the object, it may be determined that the AAV is to complete the mission, as in 1010. However, if it is determined that the AAV did contact the object, it may be determined whether the AAV is capable of completing the mission. For example, it may be determined whether the propeller that contacted the object is still operational and/or whether other components of the AAV remain operational. If all components and the propeller remain operational, it may be determined that the AAV is to complete the mission. However, if the propeller and/or components of the AAV are not operational, it may be determined that the AAV is to abort the mission, as in 1012. In some implementations, if a mission is aborted, the AAV may navigate to a designated location (e.g., a materials handling facility, relay location). In other implementations, if a mission is aborted, the AAV may land and report its position to the AAV management system and/or initiate a security profile, as described herein with respect to FIG. 9.

Figure 11:
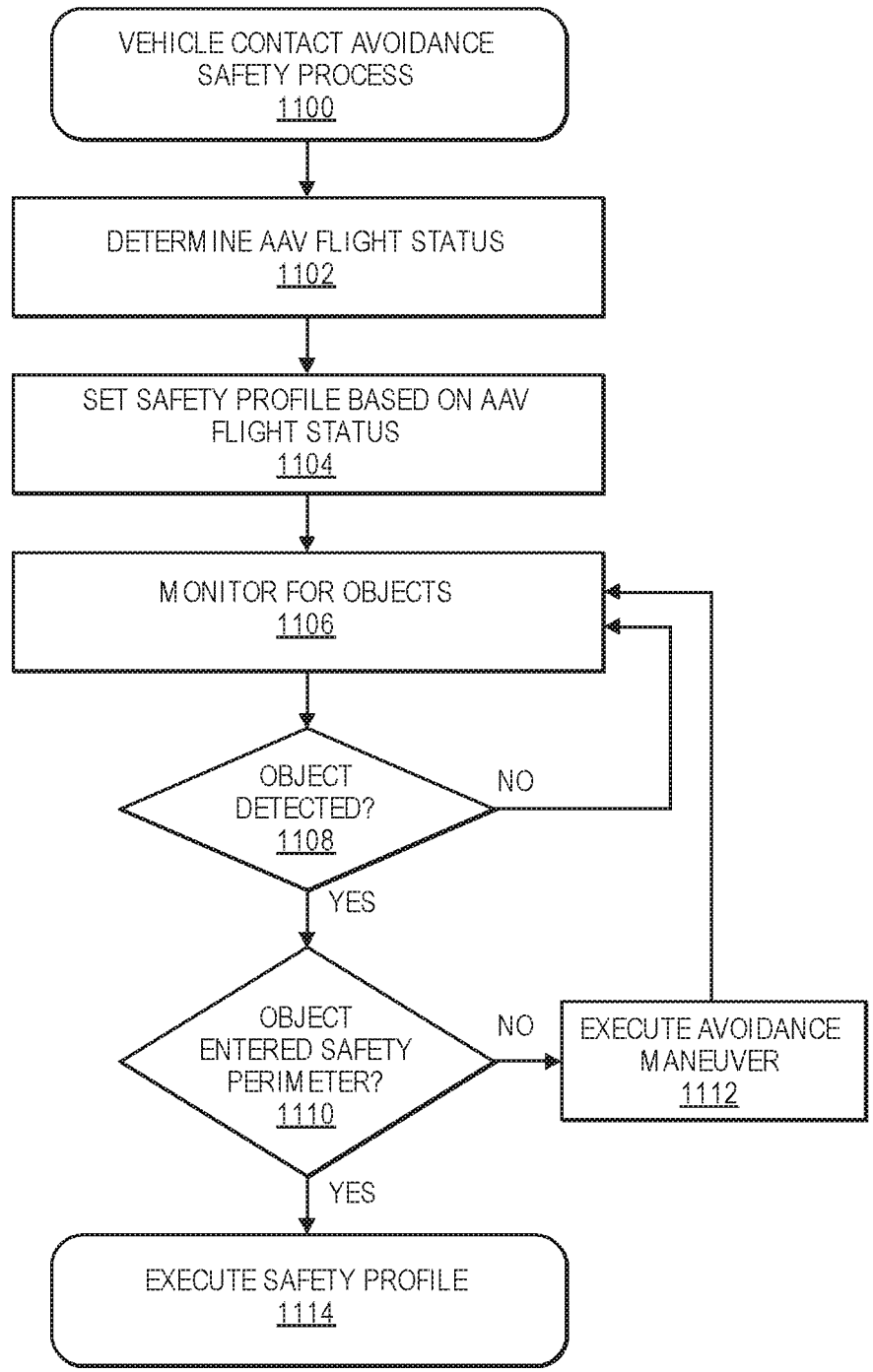
FIG. 11 is a flow diagram illustrating an example vehicle contact avoidance safety process, according to an implementation.

FIG. 11 is a flow diagram illustrating an example vehicle contact avoidance safety process 1100, according to an implementation. The vehicle contact avoidance safety process 1100 begins by determining a flight status of the aerial vehicle, as in 1102. For example, the flight status may be identified based on an indicator stored in memory, a currently selected mixer, instructions provided to the electronic speed control 1304 based on the selected mixer, or combinations thereof.

Based on the determined aerial vehicle flight status, a vehicle safety profile may be selected for the aerial vehicle, as in 1104. In this example, the vehicle safety profile may define an action or set of actions that are to be automatically performed if an object is detected, and/or if an object enters a defined vehicle safety perimeter. In some implementations, the vehicle safety perimeter and/or the vehicle safety profile may vary based on the flight status of the aerial vehicle. Different vehicle safety perimeters may be enforced for different vehicle flight statuses. Different vehicle safety profiles may include different actions that are to be performed by the aerial vehicle when an object is detected, and/or when an object enters the vehicle safety perimeter.

For example, a first vehicle safety perimeter that provides substantially equal safety distances, e.g., a safety volume, around the periphery of the aerial vehicle may be enforced when the aerial vehicle is in hover flight mode. A first vehicle safety profile corresponding to the first vehicle safety perimeter may include actions such as changing an altitude of the aerial vehicle responsive to detecting an approaching object that is outside the first vehicle safety perimeter. The first vehicle safety profile may also include actions such as slowing or stopping one or more propulsion mechanisms closest to the approaching object responsive to the object entering the first vehicle safety perimeter, and modifying operation of one or more remaining propulsion mechanisms to maintain the hover flight mode and/or perform an avoidance maneuver.

In addition, a second vehicle safety perimeter that provides larger safety distances from a leading edge of the aerial vehicle may be enforced when the aerial vehicle is in forward flight mode. A second vehicle safety profile corresponding to the second vehicle safety perimeter may include actions such as changing an altitude of the aerial vehicle, changing a direction of the aerial vehicle, changing a speed of the aerial vehicle, and/or causing the aerial vehicle to hover responsive to detecting an approaching object that is outside the second vehicle safety perimeter. The second vehicle safety profile may also include actions such as slowing or stopping one or more propulsion mechanisms closest to the approaching object responsive to the object entering the second vehicle safety perimeter, and modifying operation of one or more remaining propulsion mechanisms to maintain the forward flight mode and/or perform an avoidance maneuver.

While the above examples identify two different vehicle safety profiles, in other implementations, additional or fewer vehicle safety profiles may be utilized with the implementations described herein. Likewise, the vehicle safety profiles may include fewer or additional actions that are automatically performed in response to detecting an object entering a corresponding vehicle safety perimeter.

Upon selection of a vehicle safety profile, the example process 1100 may monitor for an object, as in 1106. In some implementations, the example process 1100 may monitor for any object that is detectable by one or more object detection components of the aerial vehicle. In another implementation, the example process 1100 may only monitor for objects entering the vehicle safety perimeter specified for the selected vehicle safety profile.

As the example process monitors for objects, a determination is made as to whether an object has been detected, as in 1108. If an object is not detected, the example process returns to block 1106 and continues. However, if an object is detected, a determination is made as to whether the detected object has entered the vehicle safety perimeter specified by the vehicle safety profile, as in 1110. For example, if the distance between the object and the aerial vehicle is less than a vehicle safety perimeter distance, it is determined that the object has entered the vehicle safety perimeter.

If it is determined that the detected object has not yet entered the vehicle safety perimeter specified by the vehicle safety profile, one or more avoidance maneuvers may be performed in an effort to prevent the object from entering the vehicle safety perimeter, as in 1112. For example, the rotation of the propellers may be altered to cause the aerial vehicle to change altitude, change direction, and/or change speed to navigate away from a position or trajectory of the detected object. In another example, the aerial vehicle may stop movement and loiter at its current position, so that it can continue monitoring the position of the object. If the object continues to approach the aerial vehicle, the aerial vehicle may then navigate away from the position or trajectory of the detected object. Navigation away from the detected object may include moving the aerial vehicle in a direction opposite the position or trajectory of the detected object and/or moving in a direction that is at least partially transverse or orthogonal to the trajectory of the detected object. For example, if the object is potentially a human, pet or other animal that is approaching the aerial vehicle from the ground, in addition to moving away from the direction of the object, the aerial vehicle may move vertically away from the ground to further distance itself from the object and reduce the potential of a contact between the aerial vehicle and the object.

If it is determined that the detected object has entered the vehicle safety perimeter of the aerial vehicle, the selected vehicle safety profile is performed, as in 1114. For example, if the first vehicle safety profile has been selected in a hover flight mode, upon detection of an object entering the vehicle safety perimeter, one or more propulsion mechanisms closest to the approaching object may be slowed or stopped, and operation of one or more remaining propulsion mechanisms may be modified to maintain the hover flight mode and/or perform an avoidance maneuver.

In other implementations, the aerial vehicle may contact the aerial vehicle management system to notify the aerial vehicle management system of its location and that the vehicle safety profile has been executed.

Figure 12:
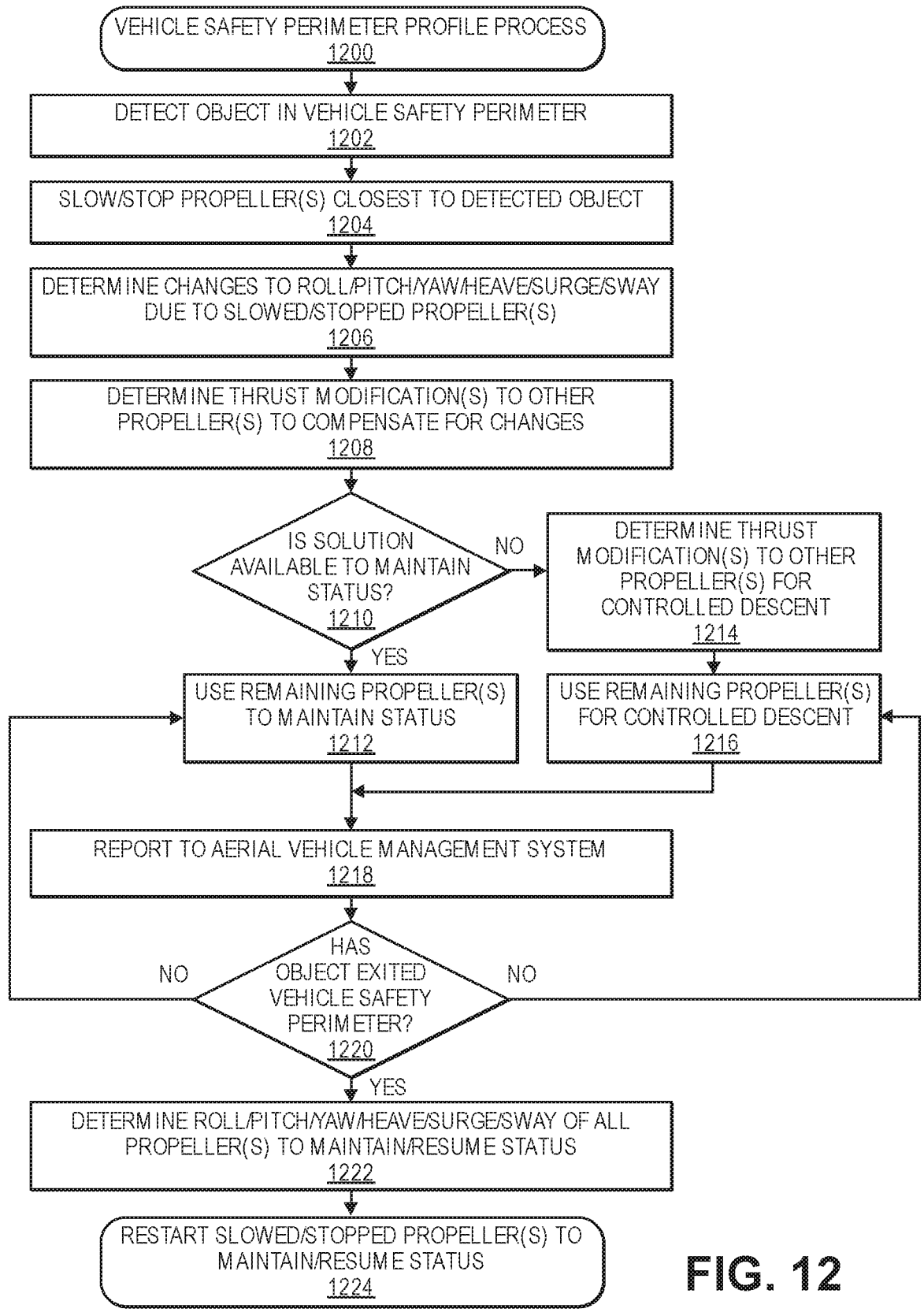
FIG. 12 is a flow diagram illustrating an example vehicle safety perimeter profile process, according to an implementation.

FIG. 12 is a flow diagram illustrating an example vehicle safety perimeter profile process 1200, according to an implementation. The vehicle safety perimeter profile process 1200 begins by detecting an object entering a vehicle safety perimeter of the aerial vehicle, as in 1202. For example, a flight status of the aerial vehicle, e.g., hover flight mode, may be determined, and a corresponding vehicle safety perimeter may be selected, e.g., vehicle safety perimeter 518-1 shown in FIGS. 5 and 6. Information and/or data from object detection components 516 may then be processed to determine that an object has entered the vehicle safety perimeter, e.g., object 606 has entered vehicle safety perimeter 518-1 as shown in FIG. 6.

The process 1200 may continue by slowing and/or stopping one or more propellers that are closest to the detected object, as in 1204. For example, a position, velocity, and/or orientation of the object relative to the aerial vehicle may be determined based on information and/or data received from the object detection components. Based on at least one of the position, velocity, or orientation of the object, one or more propellers may be identified that are closest to the object that has entered the vehicle safety perimeter, and rotations of the identified propeller(s) may be slowed or stopped.

Changes to forces affecting roll, pitch, yaw, heave, surge, or sway caused by the slowed or stopped propeller(s) may then be determined, as in 1206. For example, if one propeller has been stopped due to the approaching object, the changes to forces affecting roll, pitch, yaw, heave, surge, or sway caused by stopping the propeller may be determined. Likewise, if multiple propellers have been slowed or stopped due to the approaching object, the combined changes to forces affecting roll, pitch, yaw, heave, surge, or sway caused by the slowed or stopped propellers may be determined.

Then, thrust modifications to the remaining propellers to compensate for the slowed or stopped propeller(s) may be determined, as in 1208. For example, if one propeller of an octocopter has been stopped, a different mixer may be selected that defines thrust parameters for the remaining seven propellers to maintain a current flight status of the aerial vehicle and/or perform an avoidance maneuver. Likewise, if multiple propellers of an octocopter have been slowed or stopped, a different mixer may be selected that defines thrust parameters for the remaining, rotating propellers to maintain a current flight status of the aerial vehicle and/or perform an avoidance maneuver.

It may be determined whether a solution, e.g., a different mixer, is available that sufficiently compensates for the changes to forces affecting roll, pitch, yaw, heave, surge, or sway caused by slowing or stopping one or more propellers in order to maintain the current flight status of the aerial vehicle and/or perform an avoidance maneuver using the remaining, rotating propellers, as in 1210. If it is determined at 1210 that a solution is available, the process 1200 proceeds to modify the operation of the remaining, rotating propellers, e.g., according to the selected, different mixer, to maintain the current flight status of the aerial vehicle and/or perform an avoidance maneuver, as in 1212.

If, however, it is determined at 1210 that a solution is not available that sufficiently compensates for the changes to maintain the current flight status and/or perform an avoidance maneuver, thrust modifications to the remaining propellers may be determined in order to effect a controlled descent of the aerial vehicle, as in 1214. For example, although a mixer may not be available to maintain the current flight status and/or perform an avoidance maneuver, a different mixer may be selected that defines thrust parameters for the remaining, rotating propellers to provide a controlled descent of the aerial vehicle. Then, the process 1200 proceeds to modify the operation of the remaining, rotating propellers, e.g., according to the selected, different mixer, to effect a controlled descent of the aerial vehicle, as in 1216.

After implementing the thrust modifications to the remaining propellers at 1212 or 1216, a report or other notification may be transmitted to the aerial vehicle management system, as in 1218. The report or notification may include information about the identity and/or location of the aerial vehicle, information and/or data from the object detection components related to the detected object, other information such as position, velocity, or orientation of the detected object, information about operational status of aerial vehicle components including the slowed or stopped propeller(s) and corresponding motor(s), changes to thrust parameters of the remaining propellers, a currently selected mixer, and any other information about the aerial vehicle, the detected object, and the surrounding environment. If the aerial vehicle has completed (or is performing) a controlled descent, as in 1216, the report or notification may include additional information such as the current location of the aerial vehicle, additional information and/or data from the object detection components, e.g., images or video from optical sensors, information related to the ability of the aerial vehicle to continue its previous flight status, and any other information about the aerial vehicle, the detected object, and the surrounding environment.

While using the remaining propellers to maintain the current flight status and/or perform an avoidance maneuver, as in 1212, or to effect a controlled descent, as in 1216, the object detection components may continue to monitor the surrounding environment to determine whether the object has exited the vehicle safety perimeter, as in 1220. For example, information and/or data from object detection components 516 may be processed to determine whether the object has exited the vehicle safety perimeter. If it is determined at 1220 that the object has not exited the vehicle safety perimeter, then the process 1200 may continue operation of the aerial vehicle using the remaining propellers to maintain the current flight status and/or perform an avoidance maneuver, as in 1212, or to effect a controlled descent, as in 1216. Updated reports and/or notifications may be periodically provided to the aerial vehicle management system, as in 1218, or only when previously provided information and/or data has changed, e.g., an operational status of a slowed or stopped propeller has changed, a power supply level of the aerial vehicle is reaching a critical level, additional approaching objects have been detected, a different mixer has been selected, etc.

If, however, it is determined at 1220 that the object has exited the vehicle safety perimeter, then thrust modifications to all propellers may be determined in order to resume the operation and/or flight status of the aerial vehicle prior to detecting the object entering the vehicle safety perimeter, as in 1222. For example, if one propeller was stopped due to an approaching object and the thrust parameters of the remaining propellers were modified to compensate for the stopped propeller, responsive to determining that the object has exited the vehicle safety perimeter, a different mixer (or previously used mixer) may be selected that defines thrust parameters for all propellers to continue or resume the flight status. Then, the stopped propeller may be restarted and the thrust parameters of all propellers may be modified according to the selected mixer, as in 1224. Likewise, if multiple propellers were slowed or stopped due to an approaching object and the thrust parameters of the remaining propellers were modified to compensate for the slowed or stopped propellers, responsive to determining that the object has exited the vehicle safety perimeter, a different mixer (or previously used mixer) may be selected that defines thrust parameters for all propellers to continue or resume the flight status. Then, the slowed or stopped propellers may be restarted and the thrust parameters of all propellers may be modified according to the selected mixer, as in 1224.

Figure 13:
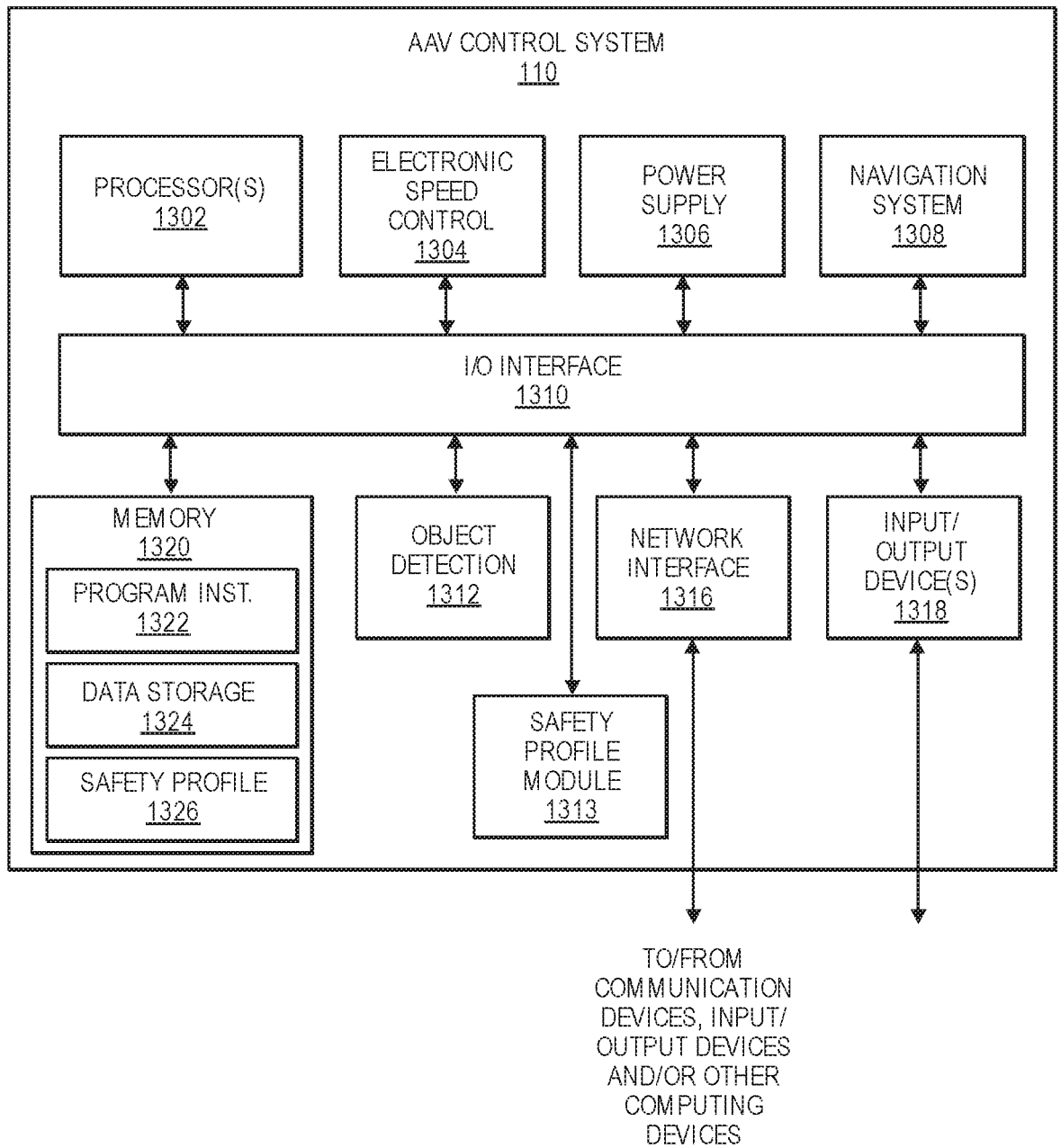
FIG. 13 is a block diagram illustrating various components of an automated aerial vehicle control system, according to an implementation.

FIG. 13 is a block diagram illustrating an example AAV control system 110 of the AAV 100. In various examples, the block diagram may be illustrative of one or more aspects of the AAV control system 110 that may be used to implement the various systems and methods discussed above. In the illustrated implementation, the AAV control system 110 includes one or more processors 1302, coupled to a non-transitory computer readable storage medium 1320 via an input/output (I/O) interface 1310. The AAV control system 110 may also include ESCs 1304, power supply module 1306 and/or a navigation system 1308. The AAV control system 110 further includes an object detection controller 1312, a network interface 1316, and one or more input/output devices 1318.

In various implementations, the AAV control system 110 may be a uniprocessor system including one processor 1302, or a multiprocessor system including several processors 1302 (e.g., two, four, eight, or another suitable number). The processor(s) 1302 may be any suitable processor capable of executing instructions. For example, in various implementations, the processor(s) 1302 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1302 may commonly, but not necessarily, implement the same ISA.

The non-transitory computer readable storage medium 1320 may be configured to store executable instructions, data, flight paths, safety profiles, and/or data items accessible by the processor(s) 1302. In various implementations, the non-transitory computer readable storage medium 1320 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 1320 as program instructions 1322, data storage 1324 and safety profiles 1326, respectively. In other implementations, program instructions, data and/or safety profiles may be received, sent or stored upon different types of computer-accessible media, such as non-transitory media, or on similar media separate from the non-transitory computer readable storage medium 1320 or the AAV control system 110. Safety profiles may include, for example, avoidance maneuvers, safety perimeter information, automatic actions to be taken when a safety perimeter is entered by an object, automatic actions to take when a contact with a propeller occurs, etc.

Generally speaking, a non-transitory, computer readable storage medium may include storage media or memory media such as magnetic or optical media, e.g., disk or CD/DVD-ROM, coupled to the AAV control system 110 via the I/O interface 1310. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 1316.

In one implementation, the I/O interface 1310 may be configured to coordinate I/O traffic between the processor(s) 1302, the non-transitory computer readable storage medium 1320, and any peripheral devices, the network interface or other peripheral interfaces, such as input/output devices 1318. In some implementations, the I/O interface 1310 may perform any necessary protocol, timing or other data transformations to convert data signals from one component (e.g., non-transitory computer readable storage medium 1320) into a format suitable for use by another component (e.g., processor(s) 1302). In some implementations, the I/O interface 1310 may include support for devices attached through various types of peripheral buses, such as a variant of the Peripheral Component Interconnect (PCI) bus standard or the Universal Serial Bus (USB) standard, for example. In some implementations, the function of the I/O interface 1310 may be split into two or more separate components, such as a north bridge and a south bridge, for example. Also, in some implementations, some or all of the functionality of the I/O interface 1310, such as an interface to the non-transitory computer readable storage medium 1320, may be incorporated directly into the processor(s) 1302.

The ESCs 1304 communicate with the navigation system 1308 and adjust the power of each propeller motor to guide the AAV along a determined flight path and/or to perform avoidance maneuvers. The navigation system 1308 may include a GPS or other similar system than can be used to navigate the AAV to and/or from a location. The object detection controller 1312 communicates with the object detection components, discussed above, and processes information received from the object detection components. For example, information received from the object detection components may be processed to detect a presence of an object, determine a position of the object with respect to the AAV, etc.

The AAV control system 110 may also include a safety profile module 1313. The safety profile module may communicate with the object detection controller 1312, the navigation system 1308, the ESCs 1304 and/or the stopping members discussed above. The safety profile module may select and/or execute the safety profiles, determine if an object has entered a safety perimeter and/or determine if a contact with a propeller by an object has occurred.

The network interface 1316 may be configured to allow data to be exchanged between the AAV control system 110, other devices attached to a network, such as other computer systems, and/or with AAV control systems of other AAVs. For example, the network interface 1316 may enable wireless communication between numerous AAVs. In various implementations, the network interface 1316 may support communication via wireless general data networks, such as a Wi-Fi network. For example, the network interface 1316 may support communication via telecommunications networks such as cellular communication networks, satellite networks, and the like.

Input/output devices 1318 may, in some implementations, include one or more displays, image capture devices, thermal sensors, infrared sensors, time of flight sensors, accelerometers, pressure sensors, weather sensors, etc. Multiple input/output devices 1318 may be present and controlled by the AAV control system 110. One or more of these sensors may be utilized to assist in the landing as well as to avoid obstacles during flight.

As shown in FIG. 13, the memory may include program instructions 1322 which may be configured to implement the example processes and/or sub-processes described above. The data storage 1324 may include various data stores for maintaining data items that may be provided for determining flight paths or flight statuses, identifying objects, generating avoidance maneuvers, retrieving inventory, landing, identifying a level surface for disengaging inventory, determining safety profiles, determining safety perimeters, etc.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the AAV control system 110 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The AAV control system 110 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated AAV control system 110. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from AAV control system 110 may be transmitted to AAV control system 110 via transmission media or signals, such as electrical, electromagnetic, or digital signals, conveyed via a communication medium, such as a wireless link. Various implementations may further include receiving, sending or storing instructions and/or data implemented in accordance with the foregoing description upon a computer-accessible medium. Accordingly, the techniques described herein may be practiced with other AAV control system configurations.

Those skilled in the art will appreciate that, in some implementations, the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various methods and systems as illustrated in the figures and described herein represent example implementations. The methods and systems may be implemented in software, hardware, or a combination thereof in other implementations. Similarly, the order of any method may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. An apparatus, comprising:
    a plurality of motors coupled to a frame;
    a plurality of propellers, each propeller coupled to and rotated by a respective motor;
    an object detection component configured to detect an object in an environment of the apparatus; and
    a controller configured to at least:
        detect, using the object detection component, an object entering a safety perimeter of the apparatus;
        determine at least one of a position, a velocity, or an orientation of the object relative to the apparatus;
        determine a first propeller of the plurality of propellers that is closest to the object based at least in part on at least one of the position, the velocity, or the orientation of the object;
        reduce rotation of the first propeller of the plurality of propellers that is closest to the object; and
        modify rotation of a second propeller of the plurality of propellers based at least in part on the reduced rotation of the first propeller.

2. The apparatus of claim 1, wherein the controller is further configured to at least:
    determine a flight status of the apparatus;
    determine the safety perimeter of the apparatus based at least in part on the flight status; and
    wherein the rotation of the second propeller is modified to maintain the flight status.

3. The apparatus of claim 1, wherein the object detection component comprises at least one of an optical sensor, an imaging sensor, a thermal sensor, an infrared sensor, an ultrasonic ranging module, a laser rangefinder, a radar distance measurement module, a stadiametric based rangefinder, a parallax based rangefinder, a coincidence based rangefinder, a Lidar based rangefinder, a Sonar based rangefinder, a time-of-flight based rangefinder, a thermal imaging module, an infrared module, or a camera.

4. The apparatus of claim 1, wherein the controller is configured to reduce the rotation of the first propeller by at least one of slowing or stopping the first propeller.

5. The apparatus of claim 1, wherein the controller is configured to reduce the rotation of the first propeller by at least one of regeneratively braking a first respective motor coupled to the first propeller or removing a current from the first respective motor.

6. The apparatus of claim 1, wherein the controller is further configured to at least:
    determine changes to at least one of roll, pitch, yaw, heave, surge, or sway of the apparatus due to the reduced rotation of the first propeller; and
    wherein the rotation of the second propeller is modified based at least in part on the determined changes.

7. The apparatus of claim 6, wherein the controller is further configured to at least:
    determine that the modified rotation of the second propeller will sufficiently compensate for the determined changes due to the reduced rotation of the first propeller; and
    wherein a flight status of the apparatus is maintained.

8. The apparatus of claim 6, wherein the controller is further configured to at least:
    determine that the modified rotation of the second propeller will not sufficiently compensate for the determined changes due to the reduced rotation of the first propeller; and
    wherein a flight status of the apparatus is modified.

9. The apparatus of claim 1, wherein the controller is further configured to at least:
    reduce rotation of a third propeller of the plurality of propellers, such that rotation of at least two propellers that are closest to the object is reduced.

10. The apparatus of claim 9, wherein the controller is further configured to at least:
    modify rotation of a fourth propeller of the plurality of propellers based at least in part on the reduced rotation of the third propeller.

11. An aerial vehicle, comprising:
a plurality of motors coupled to a frame;
a plurality of propellers, each propeller coupled to and rotated by a respective motor;
an object detection component configured to detect an object in an environment of the aerial vehicle; and
a controller configured to at least:
  detect, using the object detection component, an object entering a safety perimeter of the aerial vehicle;
  determine at least one of a position, a velocity, or an orientation of the object relative to the aerial vehicle;
  determine at least one propeller of the plurality of propellers that is closest to the object based at least in part on at least one of the position, the velocity, or the orientation of the object;
  reduce rotation of the at least one propeller of the plurality of propellers that is closest to the object; and
  modify rotation of at least one additional propeller of the plurality of propellers based at least in part on the reduced rotation of the at least one propeller.

12. The aerial vehicle of claim 11, wherein the controller is further configured to at least:
determine a flight status of the aerial vehicle; and
determine the safety perimeter of the aerial vehicle based at least in part on the flight status.

13. The aerial vehicle of claim 12, wherein the flight status is a hover flight mode, and the safety perimeter in the hover flight mode comprises substantially equal safety distances in any direction around a periphery of the aerial vehicle; or
wherein the flight status is a forward flight mode, and the safety perimeter in the forward flight mode comprises a relatively larger safety distance in a forward flight direction of the aerial vehicle.

14. The aerial vehicle of claim 12, wherein the safety perimeter comprises a three-dimensional safety volume around the aerial vehicle.

15. An aerial vehicle, comprising:
a plurality of motors coupled to a frame;
a plurality of propellers, each propeller coupled to and rotated by a respective motor;
an object detection component configured to detect an object in an environment of the aerial vehicle; and
a controller configured to at least:
  determine a flight status of the aerial vehicle;
  determine a safety perimeter of the aerial vehicle based at least in part on the flight status;
  detect, using the object detection component, an object entering the safety Perimeter of the aerial vehicle;
  reduce rotation of at least one propeller of the plurality of propellers that is closest to the object; and
  modify rotation of at least one additional propeller of the plurality of propellers based at least in part on the reduced rotation of the at least one propeller;
wherein the flight status is a low altitude flight mode, and the safety perimeter in the low altitude flight mode comprises relatively larger safety distances in any direction around a periphery of the aerial vehicle; or
wherein the flight status is a high altitude flight mode, and the safety perimeter in the high altitude flight mode comprises relatively shorter safety distances in any direction around a periphery of the aerial vehicle.

16. An aerial vehicle, comprising:
a frame;
a plurality of motors coupled to the frame;
a plurality of propellers, each propeller coupled to and rotated by a respective motor;
at least one sensor; and
a controller configured to at least:
  detect, using the at least one sensor, an object entering a safety perimeter of the aerial vehicle, wherein the safety perimeter surrounds at least a portion of the aerial vehicle;
  determine at least one of a position, a velocity, or an orientation of the object relative to the aerial vehicle;
  determine a propeller of the plurality of propellers that is closest to the object based at least in part on at least one of the position, the velocity, or the orientation of the object;
  regeneratively brake the propeller that is closest to the object, wherein regenerated energy is stored by a power source of the aerial vehicle; and
  modify rotation of remaining propellers to compensate for the braked propeller.

17. The aerial vehicle of claim 16, wherein the at least one sensor comprises a plurality of optical sensors configured to detect objects in an environment around the aerial vehicle.

18. The aerial vehicle of claim 16, wherein the controller is further configured to at least:
detect, using the at least one sensor, the object in an environment around the aerial vehicle and outside the safety perimeter of the aerial vehicle; and
execute an avoidance maneuver prior to the object entering the safety perimeter.

19. The aerial vehicle of claim 16, wherein the controller is further configured to at least:
determine a flight status of the aerial vehicle; and
select the safety perimeter from a plurality of safety perimeters based at least in part on the flight status.

* * * * *